(12) United States Patent
Ishikawa et al.

(10) Patent No.: US 11,469,699 B2
(45) Date of Patent: Oct. 11, 2022

(54) WORK DEVICE

(71) Applicant: Koki Holdings Co., Ltd., Tokyo (JP)

(72) Inventors: Yuki Ishikawa, Ibaraki (JP); Hayato Yamaguchi, Ibaraki (JP); Tomomasa Nishikawa, Ibaraki (JP); Masashi Takehisa, Ibaraki (JP); Tatsuya Ito, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 110 days.

(21) Appl. No.: 16/956,608

(22) PCT Filed: Feb. 22, 2019

(86) PCT No.: PCT/JP2019/006743
§ 371 (c)(1),
(2) Date: Jun. 21, 2020

(87) PCT Pub. No.: WO2019/187848
PCT Pub. Date: Oct. 3, 2019

(65) Prior Publication Data
US 2020/0403544 A1 Dec. 24, 2020

(30) Foreign Application Priority Data

Mar. 30, 2018 (JP) .............................. JP2018-067731

(51) Int. Cl.
*H02P 23/00* (2016.01)
*B25F 5/02* (2006.01)
*B25B 21/02* (2006.01)
(52) U.S. Cl.
CPC ............ *H02P 23/0077* (2013.01); *B25F 5/02* (2013.01); *B25B 21/02* (2013.01)
(58) Field of Classification Search
CPC . B25F 5/02; B25B 21/02; B23P 19/06; H02P 23/0077; H02P 3/18; H04Q 9/00;
(Continued)

(56) References Cited

U.S. PATENT DOCUMENTS 9,756,402 B2 9/2017 Stampfl et al.
9,888,300 B2 2/2018 Stampfl et al.
(Continued)

FOREIGN PATENT DOCUMENTS

JP 2005212097 8/2005
JP 2012254519 12/2012
(Continued)

OTHER PUBLICATIONS

"Search Report of Europe Counterpart Application", dated Apr. 21, 2021, pp. 1-8.
(Continued)

*Primary Examiner* — Said Bouziane
(74) *Attorney, Agent, or Firm* — JCIPRNET

(57) ABSTRACT

In the work device that has a self-holding circuit (61) maintaining power supply from a power supply circuit (12) by output from a microcomputer (40) and has a structure in which stopping output to the self-holding circuit (61) causes interruption of power supply from the power supply circuit (12) to the microcomputer (40), the firmware of the microcomputer (40) is made to be rewritable and a power holding unit (condenser C1) for temporarily continuing power supply to the microcomputer (40) is provided, thereby realizing a so-called "off-delay timer function" for restarting the microcomputer (40). This configuration enables maintenance of power to the microcomputer (40) after update of the firmware even in a work device that cannot be restarted once power has been turned off unless trigger operation is performed, thereby enabling automatic restart of the microcomputer 40 after resetting is enabled.

14 Claims, 15 Drawing Sheets

(58) Field of Classification Search
CPC ........ H04W 4/80; H04W 48/10; B23Q 17/00; G06F 3/00; G05B 19/042
See application file for complete search history.

(56) References Cited

U.S. PATENT DOCUMENTS

2017/0060471 A1* 3/2017 Yamamoto ............ G06F 3/0685
2017/0093308 A1 3/2017 Lo et al.
2017/0359634 A1* 12/2017 Stampfl ................ H04W 48/10

FOREIGN PATENT DOCUMENTS

| JP | 2014018868 | 2/2014 |
| JP | 2015188997 | 11/2015 |
| JP | 201649594 | 4/2016 |

OTHER PUBLICATIONS

Office Action of Australian Counterpart Application, dated Jun. 9, 2021, pp. 1-6.
"International Search Report (Form PCT/ISA/210)"of PCT/JP2019/006743, dated May 7, 2019, with English translation thereof, pp. 1-4.

* cited by examiner rewriting flow of flash memory (case of normal end)

rewriting flow of flash memory (case of abnormal end)

WORK DEVICE

CROSS-REFERENCE TO RELATED APPLICATION

This application is a 371 application of the International PCT application serial no. PCT/JP2019/006743, filed on Feb. 22, 2019, which claims the priority benefits of Japan Patent Application No. 2018-067731, filed on Mar. 30, 2018. The entirety of each of the above-mentioned patent applications is hereby incorporated by reference herein and made a part of this specification.

BACKGROUND OF THE INVENTION

Technical Field

The present invention makes firmware be easily rewritable in a cordless work device configured so that power of a microcontroller is turned on by initial operation of a changeover switch and power of the microcontroller is turned off by a delay timer function.

Related Art

In a portable work device using a detachable battery, a microcontroller is widely used in a control apparatus that controls operation of the device. A power tool which is one type of work devices may have an independent power switch and turn the power switch on and off according to the intention of a user, but in the case of a power tool which is transportable and has a trigger switch, without having a dedicated power switch, the power is automatically turned on by starting supply of driving power to the microcontroller of the control apparatus at the moment when the trigger switch is initially pulled (for example, see patent literature 1 below). In a battery-driven power tool, after the power is turned on, the microcontroller turns off the power itself when the trigger switch is not operated and the OFF state is kept for a certain time. By arranging a function that the microcontroller turning off the power itself, power of the battery consumed by the microcontroller when the work device is not used is suppressed.

LITERATURE OF RELATED ART

Patent Literature

Patent literature 1: Japanese Patent Laid-Open No. 2014-018868

SUMMARY

Problems to be Solved

A microcontroller used for a work device such as a power tool can perform operation of a device, for example, control of a motor, by executing a computer program for operation. There are various types of front end tools that can be mounted on the power tool, and there are also various work applications of the tools. Accordingly, control of a required motor also differs depending on the work target and the work application. Regarding a rotation speed of the motor, a motor rotation number can be controlled according to the operation amount of a trigger switch operated by an operator. Even with the same tightening work, it is preferable to change a setting rotation number and the like that can be operated by the trigger operation because the difference in the screw diameter size or the tightening target is large. Therefore, in the technology of patent literature 1, the operator can set optimal set parameters for various work of the power tool from the outside of the power tool. However, because the operation target of the power tool varies and the control thereof is also diverse, there is also a case in which it is preferable to change not only the set parameters but also the firmware (control program) itself of the microcontroller in accordance with the operation target. For example, the following case is one example in which the firmware adds a new function, such as adding a new Tek screw tightening mode, to a power tool specialized in normal screw tightening work and bolt tightening work. In order to add a new function, it is necessary to update the firmware executed by the microcontroller.

The present invention has been made in view of the above background, and an objective of the present invention is to make firmware be updatable using a wireless communication terminal such as a smartphone in a work device that starts a microcontroller by operation of a specific switch such as a trigger switch. Another objective of the present invention is to provide a work device that enables automatic restarting according to an instruction of a microcontroller during update work of firmware. Still another objective of the present invention is to provide a work device with which it is possible to limit operation of a work device during update of set parameters or firmware and safely and reliably perform rewriting of the set parameters or the firmware. Another objective of the present invention is to provide a work device with which it is possible to avoid unintended data corruption during rewriting of set parameters or firmware, and to use a backup of internal data even when data corruption occurs.

Means to Solve Problems

Representative features of the invention disclosed in this specification are described as follows. According to one feature of the present invention, a work device includes: a control apparatus that controls an operation of a device, a microcontroller arranged in the control apparatus and used for executing a program, a motor that operates the device, a battery that supplies electric power to the microcontroller and the motor, a power supply circuit that generates a constant low voltage supplied to the control apparatus from the electric power of the battery, and a changeover switch for supplying the electric power from the battery to the control apparatus, power supply from the power supply circuit to the control apparatus being started by an operation of the changeover switch; wherein the control apparatus is equipped with a self-holding circuit that continues to maintain power supply from the power supply circuit by output from the microcontroller even after the operation of the changeover switch is returned, and the microcontroller stops output to the self-holding circuit to thereby stop the power supply from the power supply circuit to the control apparatus. In addition, the control apparatus is equipped with a power holding portion for temporarily continuing the power supply to the microcontroller even after the power supply from the battery to the microcontroller is cut off, and a so-called "off-delay timer function" for restarting the microcontroller is realized. In addition, the power holding portion is connected to the self-holding circuit and includes an electricity storage part. The power holding portion may further include a comparator for stabilizing output from the electricity storage part. Furthermore, the power holding portion is equipped with an electricity discharge part and configured to discharge electric power of the electricity storage part when power supply of the microcontroller is cut off and a fixed time has elapsed, and the electricity storage part is configured to store electricity every time the microcontroller is started.

According to another feature of the present invention, the work device further includes a communication apparatus capable of wirelessly performing two-way communication between an external device and a microcontroller, and a rewritable memory apparatus (for example, an EEPROM) that causes the work device to perform a predetermined operation and stores a program; the microcontroller reflects an update new program obtained from the outside via the communication apparatus in the memory apparatus. In addition, a regulation mechanism that mechanically regulates an operation of a changeover switch is arranged in the work device, and writing of the program to a ROM of the microcontroller is allowed only when the operation of the changeover switch is regulated by the regulation mechanism. The work device further includes a motor that operates the device. The regulation mechanism has a changeover portion for switching a rotation direction of a motor, and the changeover portion has, in addition to a lock position where an operation of the changeover switch is prevented, at least one rotation position where the operation is allowed. This work device includes a work device such as a power tool having an impact mechanism that transmits a rotation force of the motor to a front end tool via a power transmission mechanism. The changeover switch is a trigger switch arranged in a housing, and the changeover portion is a forward/reverse changeover switch for switching a rotation direction of the motor.

According to still another feature of the present invention, the memory apparatus further has a second storage region different from a storage region in which a program is stored, and an update program received from the outside is stored in the second storage region. By arranging the second storage region serving as a backup storage region in this manner, it is possible to easily perform recovery processing even if firmware update fails.

Effect

According to the present invention, because the user can use a smartphone or the like to update the firmware, it is possible to easily perform function addition, control change and the like of the work device. In addition, due to the configuration in which the microcontroller can be automatically restarted after writing of the set parameters or the firmware, the user can complete update of the set parameters or the firmware without any special operation. Furthermore, an update check or an operation check is performed after the microcontroller is restarted, the rewriting is considered to fail if there is an abnormality, and a notification part such as LEDs prompts re-reception of the firmware and the like, and thus the set parameters or the firmware can be updated reliably. Furthermore, when the update of the set parameters or the firmware fails, the work device is put into an inoperable state, and thus the safety can be sufficiently secured. According to these configurations, it is particularly effective during update of the firmware that defines operations of the work device.

DESCRIPTION OF THE EMBODIMENTS

Example 1

Figure 1:
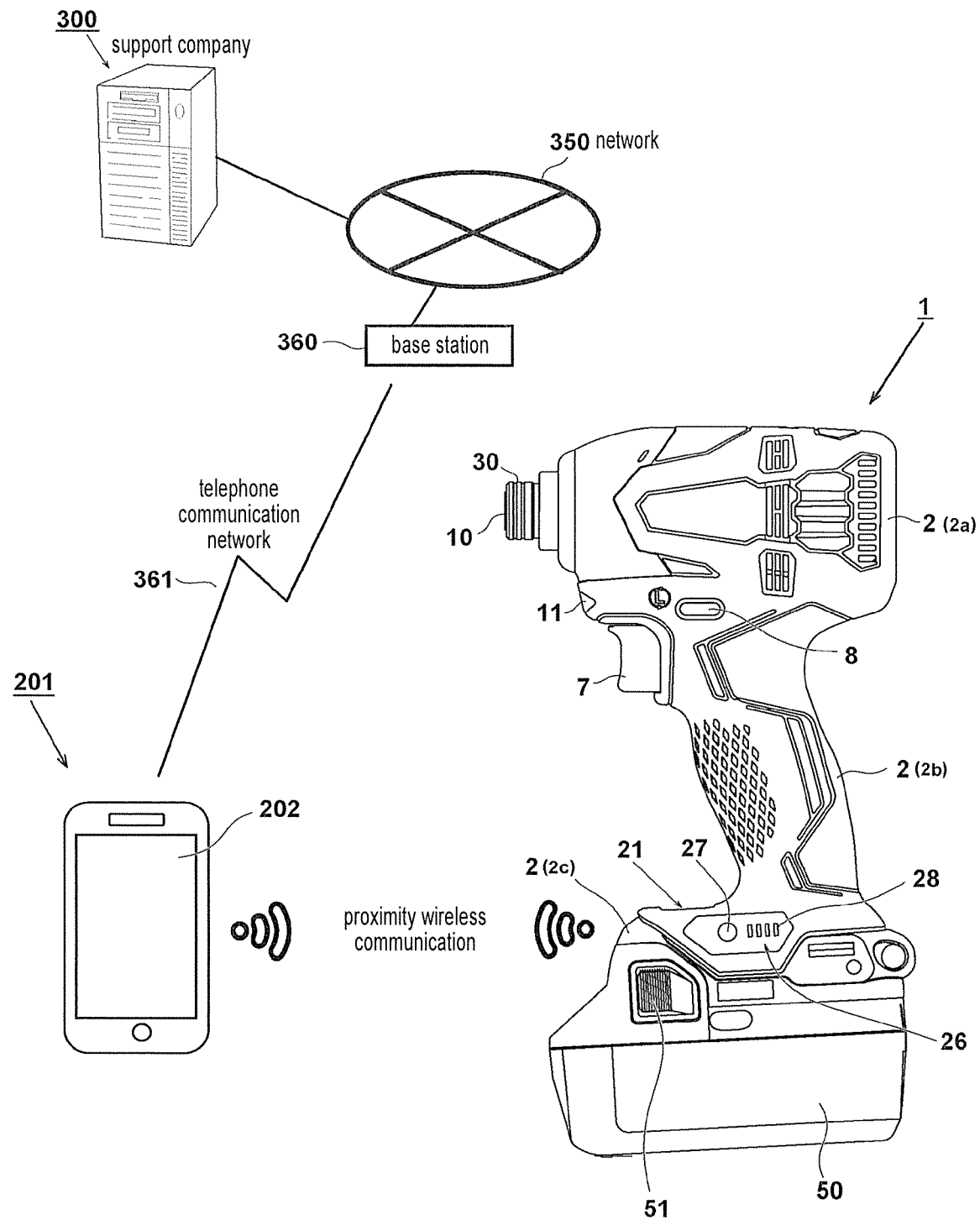
FIG. 1 is an overall view of a program update system of a power tool 1 according to an example of the present invention.

Hereinafter, examples of the present invention are described with reference to the drawings. Besides, in the following drawings, a power tool 1 is used for description as an example of a work device that operates using a detachable battery. The same parts are denoted by the same reference signs, and repeated description is omitted. In addition, in this specification, the front, rear, left, right, up and down directions are described as directions shown in the drawings.

FIG. 1 is an overall view of a program update system of the power tool 1 according to Example 1 of the present invention. The power tool 1 is a work device, for example, an impact driver, which transmits a rotation force of a motor to an anvil 10 via a power transmission mechanism, and which rotates a front end tool (not shown) held by a tool holding portion 30 to perform work such as screw tightening or bolt tightening. The power tool 1 uses a detachable battery 50 as a power source. A housing 2 of the power tool 1 mainly includes three parts, that is, a substantially cylindrical body portion 2a for accommodating a motor or a power transmission mechanism not shown, a grip portion 2b for an operator to grip with one hand, and a battery mounting portion 2c connected to the lower end of the grip portion 2b and used for mounting the detachable battery 50. The anvil 10 serving as an output shaft protrudes from an opening on the front side of the body portion 2a, a mounting hole (not shown) having a hexagonal cross-sectional shape and used for mounting a front end tool (not shown) is formed at the front end of the anvil 10, and a tool holding portion 30 capable of mounting the front end tool with one touch is arranged on the outer peripheral side of the mounting hole. The grip portion 2*b* of the housing 2 is integrally formed to extend substantially perpendicularly from the body portion 2*a*, and a trigger switch 6 (see FIG. 5 described later) having a trigger lever 7 is arranged near the upper part of the grip portion 2*b*. On the upper rear side of the trigger lever 7, a forward/reverse changeover lever 8 that switches a rotation direction of the motor is arranged.

The battery 50 is mounted below the battery mounting portion 2*c*. The battery 50 accommodates a plurality of cells such as lithium ion batteries therein and is configured to be attachable to and detachable from the power tool 1. When the battery 50 is detached, the battery 50 is made to slide forward while latch buttons 51 on the left and right sides are pressed in. A control circuit board not shown is mounted inside the battery mounting portion 2*c*, below the grip portion 2*b* and above the battery 50. In the battery mounting portion 2*c*, a first operation panel 21 is arranged near the upper surface exposed to the outside, and a second operation panel 26 is arranged on the left side surface. The first operation panel 21 is equipped with two switch buttons which are a lighting switch and a battery remaining amount display switch of an irradiation device 11, and a battery remaining amount display lamp using a plurality of LEDs. The second operation panel 26 is equipped with a mode selection switch 27 for selecting an output mode of the motor, and a mode display lamp 28 consisting of four LEDs. In the mode selection switch, a rotation speed of the motor when the trigger lever 7 is fully pulled may be set to four levels from low speed to high speed, or control for changing the operation or strike condition of the motor such as a wood screw tightening mode, a bolt tightening mode, a Tek screw mode may be switched.

A control circuit board (not shown) having a function of controlling the speed of the motor by pulling operation of the trigger lever 7 is accommodated at the lower part in the grip portion 2*b* of the power tool 1, and a microcontroller (described in detail with reference to FIG. 3) is mounted on the control circuit board. Furthermore, a wireless communication apparatus (described later with reference to FIG. 3) is arranged at an arbitrary site inside the housing 2. The communication standard used in the wireless communication apparatus is, for example, Bluetooth (registered trademark of US Bluetooth SIG, Inc.) and is used for two-way information exchange using radio waves between information terminals within a short distance of less than tens of meters. As a partner device for wireless communication with the power tool 1, a smartphone 201 capable of using the Bluetooth (registered trademark) is used. The smartphone 201 is connected to a base station 360 of a telephone company using a telephone communication network 361, and can be connected using a network 350 from the base station 360 to a server 300 of a support company that provides information, update programs, update data for support of the power tool 1. The support company that performs support may be the manufacturer of the power tool 1 or other companies. The type of the smartphone 201 used here is arbitrary and may be a PC (Personal Computer), a tablet PC, or other information terminal devices capable of using the Bluetooth (registered trademark). In addition, a line path and line means from the smartphone 201 to the server 300 are arbitrary, and a known internet line, a dedicated line network provided by a telephone company, a LAN line at home or in a company, and the like may be appropriately used.

The smartphone 201 is connected to the server 300 using the Internet and obtains information necessary for maintenance of the power tool 1 from the server 300. When obtaining the necessary information, it is important to install, on the smartphone 201, dedicated software (application software) referred to as "application" that enables communication with the power tool 1 and communication with the server 300. The smartphone 201 specifies a partner model on which proximity communication is to be performed, that is, the power tool 1, establishes communication with the power tool 1, and is further connected to the server 300 to thereby transmit identification information of the power tool 1 to be maintained to the server 300, receive necessary information relating to the power tool 1 (firmware to be updated) from the server 300, and use a proximity wireless line to transmit the received information (programs, data, and the like) to the power tool 1.

Figure 2:
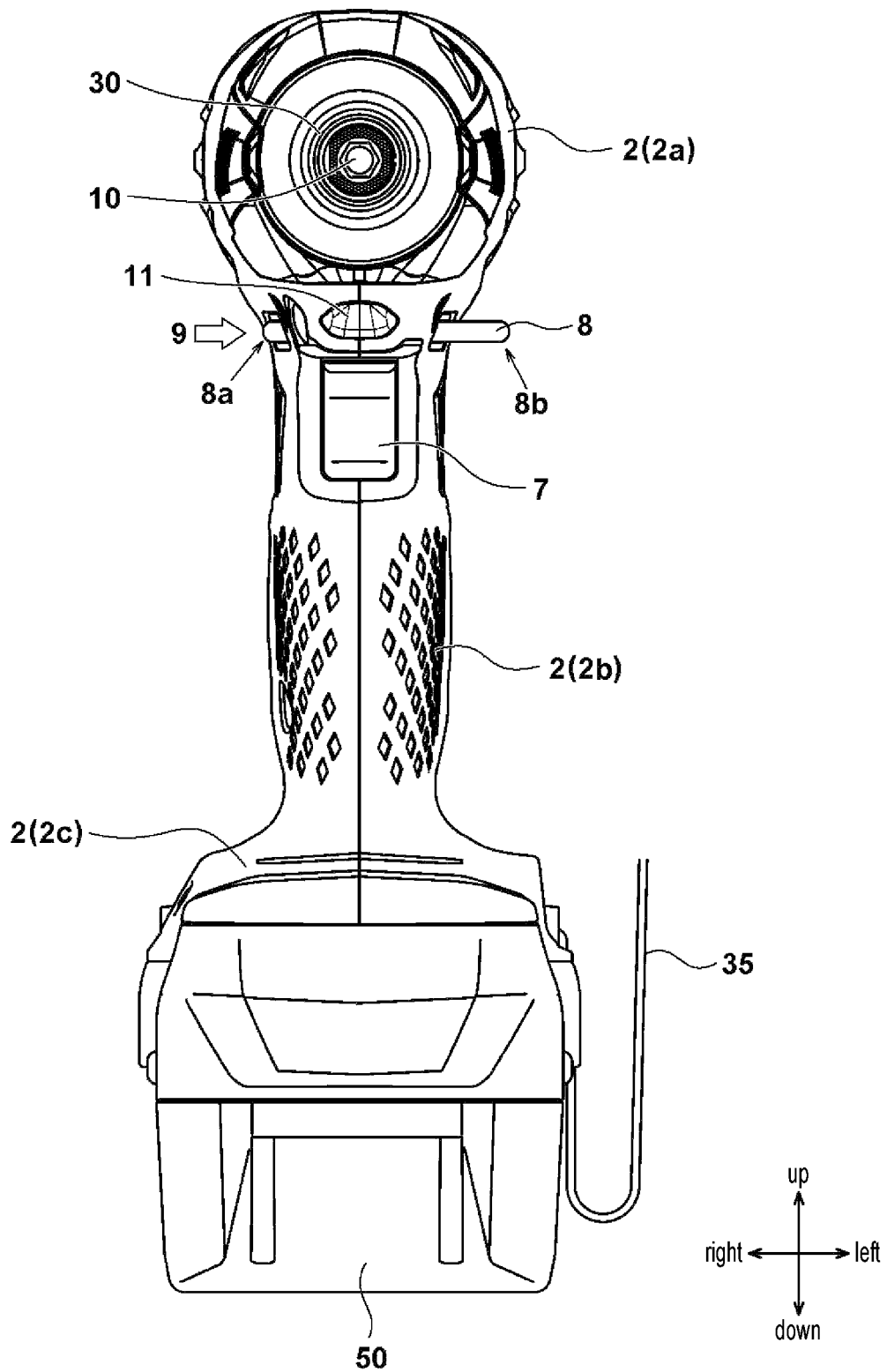
FIG. 2 is a front view of the power tool 1.

FIG. 2 is a front view of the power tool 1 shown in FIG. 1. As can be seen from the front view, the width of the battery mounting portion 2*c* in the left-right direction with respect to the grip portion 2*b* is formed sufficiently large corresponding to the size of the upper surface of the battery 50. Therefore, a control circuit board not shown can be mounted in the inner space of the battery mounting portion 2*c*. On the left side of the battery 50, a hook 35 for attaching the power tool 1 to a waist belt or the like of the operator is arranged. The hook 35 which is fixed to the battery mounting portion 2*c* with a screw and the like can also be attached to the right side surface instead of the left side surface of the battery mounting portion 2*c*, or can be attached to neither side surface.

At the upper part in the grip portion 2*b*, the trigger lever 7 protrudes forward, and the forward/reverse changeover lever 8 for setting the rotation direction of the anvil 10 is arranged above the trigger lever 7. The forward/reverse changeover lever 8 is disposed so as to penetrate from the right side to the left side of the body portion 2*a*, and is movable in a direction orthogonal to the direction in which the trigger lever 7 is operated. When the right side part is pressed as indicated by an arrow 9 in the forward/reverse changeover lever 8, the motor not shown rotates in the forward rotation direction (the direction of screw tightening). At this time, a right end 8*a* of the forward/reverse changeover lever 8 approaches the body portion 2*a*, and a left end 8*b* is separated from the body portion 2*a*. The forward/reverse changeover lever 8 are held at three positions, which are a forward rotation position as shown in FIG. 2, a position of the reverse rotation direction (the loosened direction of the screw) in which the left end 8*b* is pressed in and moved close to the body portion 2*a*, and an intermediate position (a neutral position) between the two positions. These three positions determine the operation position of an action portion 6*c* (see FIG. 5) described later with reference to FIG. 5.

Figure 3:
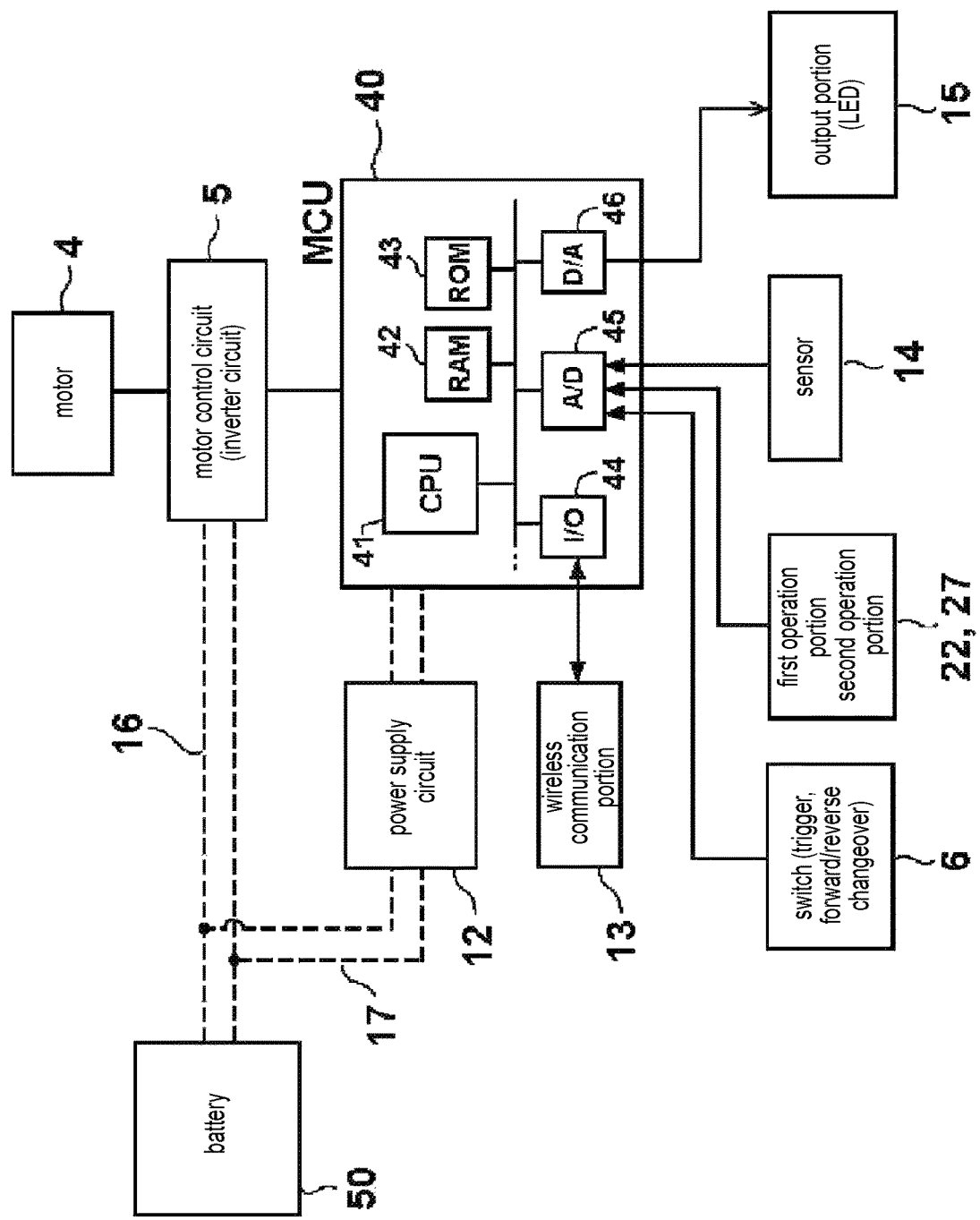
FIG. 3 is a block diagram showing a schematic configuration of a control circuit of the power tool 1.

FIG. 3 is a block diagram showing a configuration of a control circuit of the power tool 1. The microcontroller 40 is a semiconductor integrated circuit which has a central processing unit (CPU) 41, and in which one chip is equipped with components necessary for operation of the central processing unit, for example, a random access memory (RAM) 42 for securing a memory space necessary for the operation of the CPU 41, a read-only memory (ROM) 43 for storing programs executed by the CPU 41 or various data, parameters and the like, an input/output circuit (I/O) 44 for transmitting/receiving signals to/from an external device, an A/D circuit 45 for converting an analog signal input from the outside into a digital signal, a D/A circuit 46 for outputting an analog signal to an external device according to an instruction from the CPU 41, and the like. FIG. 3 shows only the main components in the microcontroller 40, but the microcontroller 40 may include a memory apparatus, that is, a memory control unit for performing data rewriting of the ROM 43, or other circuits.

The microcontroller 40 mainly performs, for example, rotation control of a brushless DC motor 4 by sending a control signal to a motor control circuit 5 such as an inverter circuit. The motor control circuit 5 in the case of using a brushless DC motor uses an inverter circuit to convert a direct current into an alternating current and supply an exciting voltage of an arbitrary frequency to a coil of the motor 4, the inverter circuit being composed of six semiconductor switching elements such as FETs (field effect transistor) and IGBTs (insulated gate bipolar transistor). A position detection sensor (not shown) such as a Hall IC not shown is arranged in the motor 4, and output of the Hall IC is input to the position detection sensor. In this manner, the microcontroller 40 precisely detects the rotation position of a rotor and thereby changes the phase and frequency of a driving current in accordance with the rotation position of the rotor. As a result, it is possible to realize smooth rotation with good driving efficiency from a low speed to a high speed, and to realize the power tool 1 having low power consumption and high efficiency.

A direct current is supplied from the battery 50 to the inverter circuit included in the motor control circuit 5 via a power line 16. The battery 50 of the example is configured so that a plurality of battery cells is packed in the housing and can be attached to and detached from the power tool 1, but the type of power supply of the power tool 1 of the present invention is not limited to the DC power supply, and a DC current may be supplied to the motor control circuit 5 via a rectifier (AC/DC converter) that converts an AC power supply supplied from the outside into a direct current. The output of the battery 50 is also supplied to the power supply circuit 12 by a power line 17 branched from the power line 16. In FIG. 3, the power line 16 or the power line 17 branched from the power line 16 to the power supply circuit 12 is indicated by a dotted line. The power supply circuit 12 is a power supply circuit that generates a constant low-voltage direct current for operation of electronic elements mounted on the control circuit board, particularly, the microcontroller 40. The power supply circuit 12 is, for example, a DC/DC converter using a three-terminal regulator, inputs electric power of the battery 50 of, for example, 14.4 V, 18 V or 36 V and outputs a direct current of 3.3 V or 5.0 V.

The trigger switch 6 for turning on or off rotation of the motor 4 in the same manner as a known power tool is arranged in the power tool 1. Although not shown here, the trigger switch 6 connects or disconnects the power line 16 as a mechanical switch circuit. If the arrangement position of the trigger switch 6 is set closer to the battery 50 side than the branch position from the power line 16 to the power line 17, power supply to the power supply circuit 12 can also be turned on or off by turning on the trigger switch 6. The output of the trigger switch 6 includes a signal representing the pulling amount of the trigger lever 7 and an indication signal representing the rotation direction of the motor, and is connected to an A/D conversion input port of the microcontroller 40. Furthermore, output of a first operation portion 22 arranged on the first operation panel 21 and output of the mode selection switch 27 serving as a second operation portion arranged on the second operation panel 26 are connected to the A/D circuit 45 of the microcontroller 40. An output portion 15 is connected to the D/A circuit 46 of the microcontroller 40. The output portion 15 includes the irradiation device 11 using an LED or the like that irradiates the vicinity of the front end tool, LEDs of the mode display lamp 28, and the like. Besides, the configuration of the trigger switch 6 includes a type that mechanically connects and disconnects the power line 16 and a type that does not mechanically connect and disconnect the power line 16. When there is mechanical connection/disconnection, it is preferable to control only the motor control circuit 5 and dispose the trigger switch 6 at a site closer to the motor control circuit 5 than the branch position of the power line 16. On the other hand, when the trigger switch 6 does not mechanically connect/disconnect the power line 16, the rotation of the motor is turned on and off only according to a motor driving signal of the microcontroller 40. Therefore, the mechanical contact portion of the trigger switch 6 is used to turn on the power of the microcontroller 40, and a signal (A/D value) corresponding to the pulling amount of the trigger lever 7 is read in by the microcontroller 40. Then, the microcontroller 40 outputs a driving signal to the motor control circuit (the inverter circuit) 5 based on the A/D value input from the trigger switch 6.

In the housing of the power tool 1, a wireless communication portion 13 that wirelessly performs two-way communication with an external device is arranged. The wireless communication portion 13 includes a transceiver manufactured based on a known wireless communication standard, and the widely used Bluetooth (registered trademark) is used here, but the wireless communication technology is not limited hereto, and any other wireless communication technology, for example, a communication method such as optical communication or infrared communication may be used as long as proximity communication from about several centimeters to tens of meters is possible. Because the wireless communication portion 13 is connected to an I/O port 44 of the microcontroller 40, the CPU 41 can communicate with a device outside the power tool 1 (here, the smartphone 201 shown in FIG. 1).

Next, a rough procedure for program update of the power tool 1 using the smartphone 201 is described with reference to FIG. 4. As shown in (A) of FIG. 4, the operator first slightly pulls the trigger lever 7 to thereby turn on the power of the power tool 1. The reason is that the power tool 1 is not equipped with an independent switch circuit, such as a main switch, for mechanically turning on or off a power path to the control circuit, so that the microcontroller is started upon the first trigger operation. A small operation amount under which the motor slightly rotates is sufficient as the operation amount of the trigger lever 7. The operator can confirm that power of the microcontroller has been turned on by confirming a rotation sound of the motor.

Figure 4:
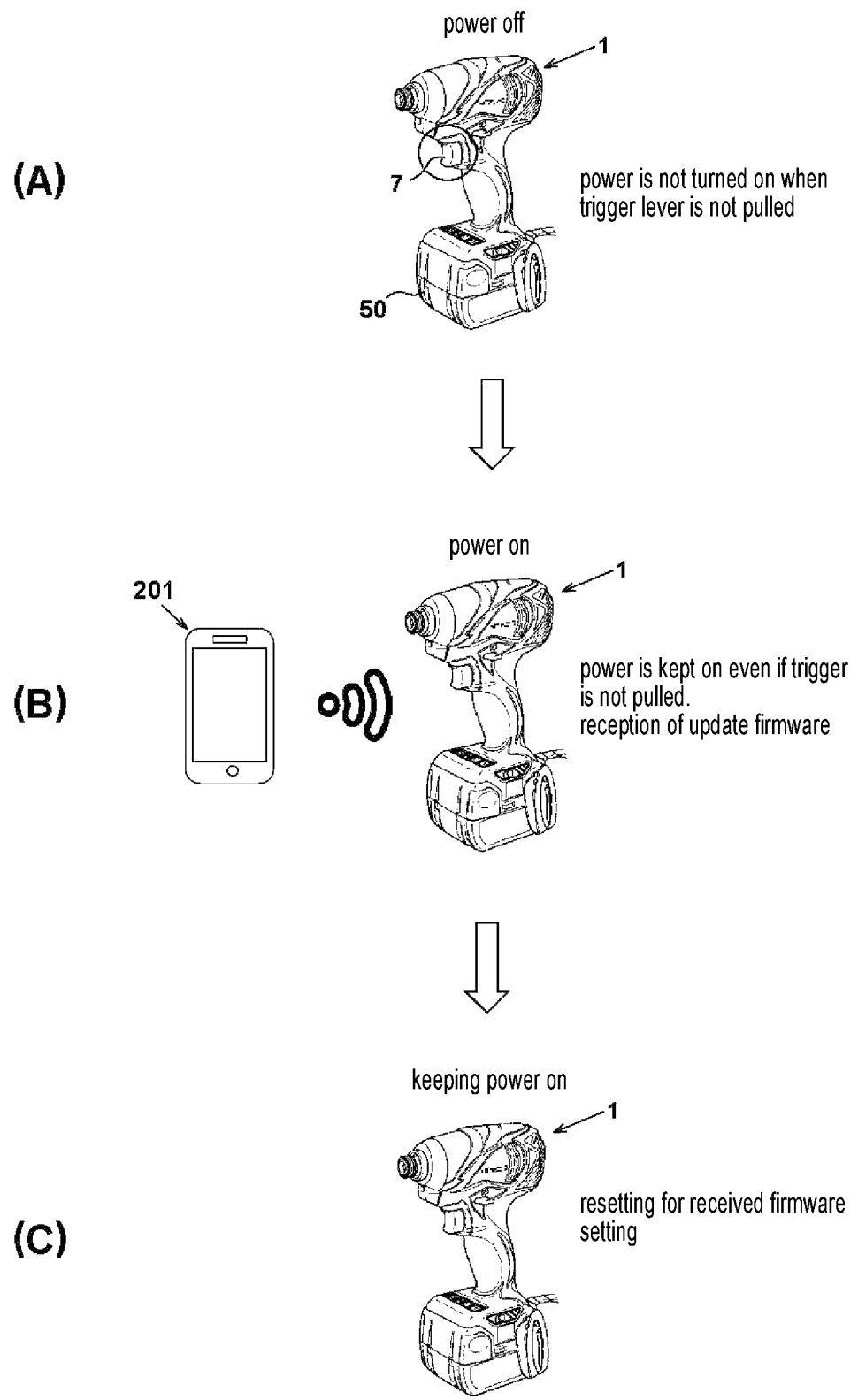
FIG. 4 is a diagram showing a program update procedure of the power tool 1.

Next, in (B) of FIG. 4, the microcontroller communicates with the smartphone 201 during the time for maintaining the power-on state of the power tool 1, and acquires update programs (here, firmware) for operation of the microcontroller. The data transmission from the smartphone 201 to the power tool 1 can be also realized by one-way communication, but it is preferable to use two-way communication so that whether the reception or update on the power tool 1 side is normally performed or not can be monitored from the application of the smartphone 201. Besides, it is important that communication with the smartphone 201 is performed in a state where the operation of the power tool 1 is stopped, particularly in a state where the motor does not rotate. The reason is that rewriting the firmware while the power tool is operating may damage the motor or the control circuit. In order to prevent this situation, the power tool having the forward/reverse changeover switch is preferably configured so that the power tool can communicate with the smartphone only when the forward/reverse changeover switch is neutral.

The operator needs to establish a wireless communication path between the smartphone 201 side and the power tool 1 side before starting communication. In this operation, when the Bluetooth (registered trademark) is used, the power tool 1 side is set into a pairing mode (connection standby state), and the Bluetooth mode of the smartphone 201 is turned on to establish connection to the power tool 1. In order to set the power tool 1 side into the pairing mode (connection standby state), a special operation may be performed, for example, a plurality of operation buttons are simultaneously long-pressed for about five seconds. At this time, by performing a lighting mode in which the mode display lamp 28 is not operated in the normal operation of the power tool 1, for example, a special lighting for simultaneously blinking the mode display lamp 28 consisting of four LEDs, the operator can be notified of entrance to the pairing mode. When the paring is completed and the connection between the smartphone 201 and the power tool 1 is completed, by performing lighting with the special lighting or blinking method of the mode display lamp 28 (a lighting mode not used in the normal operation of the power tool 1, for example, turning on only two LEDs on both sides), the operator can confirm that the power tool 1 has been connected. Besides, on the smartphone 201 side, it can be confirmed on a screen 202 that the power tool 1 has been connected. With the above configuration, the power tool 1 can safely perform reception and rewriting of the update firmware, and can further prevent a malicious person from arbitrarily changing the settings.

Next, in (C) of FIG. 4, the power tool 1 rewrites the received update firmware, and then is switched into the control using the updated firmware by restarting the microcontroller. In the power tool such as an impact tool, the main switch does not exist, and thus a problem is generated when the microcontroller 40 is reset for updating the firmware. In the conventional power tool, when the operation of the trigger lever 7 is started, the microcontroller outputs a self-holding signal of the power supply to keep the switching element at a conductive state, and thereby keeps the power path of the battery 50 and the power supply circuit 12 (see FIG. 3) at the ON state. However, when the microcontroller is reset, the self-holding signal from the microcontroller disappears, and thus the microcontroller 40 cannot be started unless the user pulls the trigger lever 7 again. Thus, in the example, a circuit (a self-holding circuit 61 described later with reference to FIG. 7) is added which is capable of keeping the ON state of the power path of the battery 50 and the power supply circuit 12 (see FIG. 3) when the microcontroller 40 is shut down for resetting, and thereby it is possible to complete the update work of the firmware. Besides, the pairing mode on the power tool 1 side is released by resetting the microcontroller 40.

As described above, if a wireless communication part is added to the power tool 1 so that the firmware for the microcontroller 40 can be updated, the firmware update of the power tool 1 can be performed by the user. In addition, by using the smartphone 201 as an auxiliary device that performs the update work of the firmware, the update work can be easily performed by only installing an update application on the smartphone 201. At this time, if an operation for turning on the power of the power tool 1, an instruction of the setting position of the forward/reverse changeover lever 8, an illustration of the operation buttons simultaneously long-pressed for the transition to the pairing mode and the like are sequentially displayed on the screen 202 of the smartphone 201, even a user who is not accustomed to the update work of the firmware can also reliably perform the work. Besides, because the external appearance on the power tool 1 side, particularly the number of the operation buttons and the like are the same as that of the conventional power tool 1, no change in the external appearance is required even for a power tool which enables the update work of the firmware.

Figure 5:
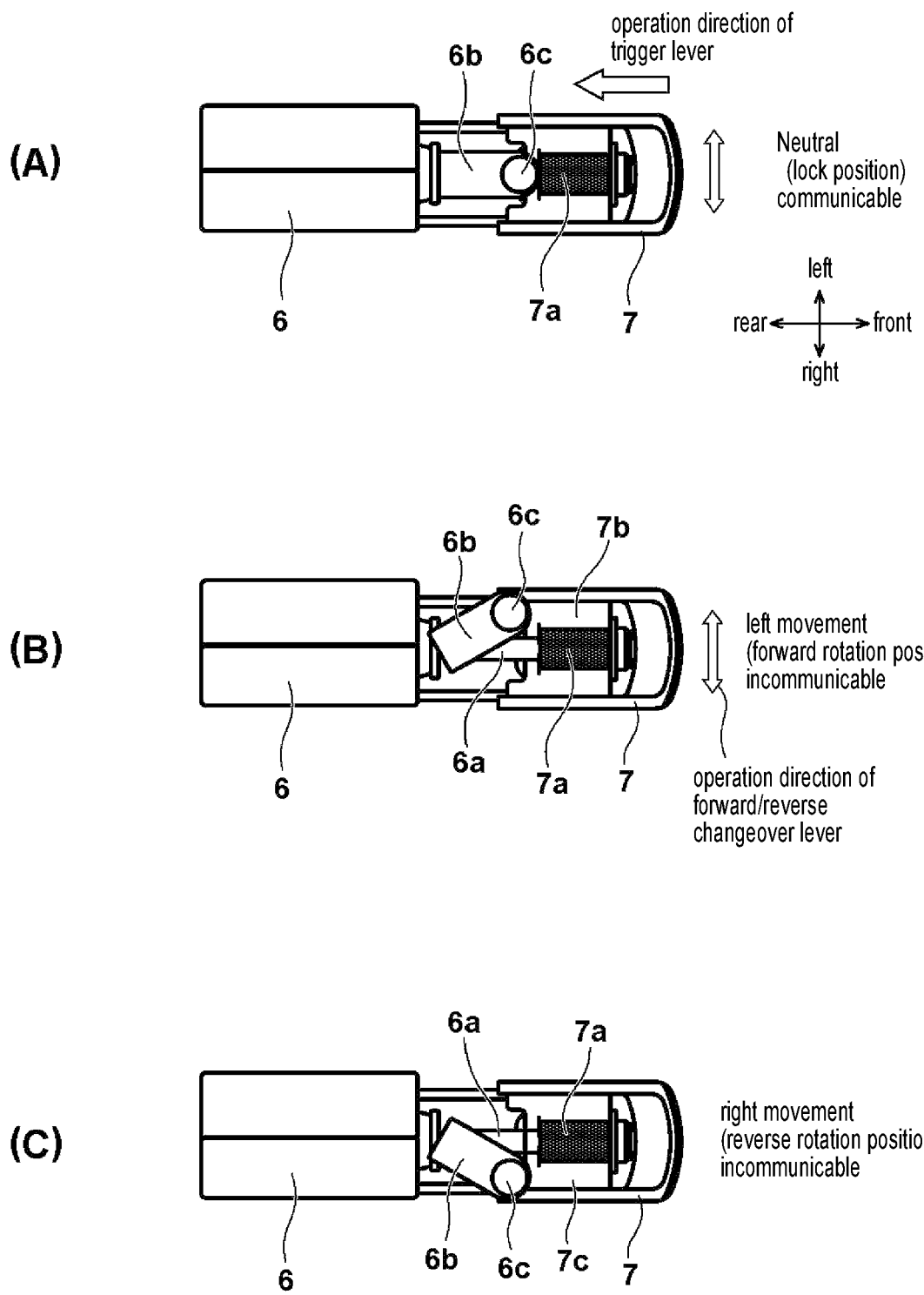
FIG. 5 is a top view of a single trigger switch 6 of the power tool 1.

FIG. 5 is a top view of the single trigger switch 6. As shown in (A) of FIG. 5, inside the housing of the trigger switch 6, a first switch mechanism (not shown) operated by the trigger lever 7 capable of moving forward and backward, and a second switch mechanism (not shown) operated by a swing arm 6b also arranged on the upper side of the trigger lever 7 are arranged. The first switch mechanism outputs a signal proportional to the movement amount of the trigger lever 7 to the microcontroller 40 by the movement of a plunger 6a corresponding to the operation of the trigger lever 7. The first switch mechanism may have two systems consisting of an on-off switch that turns on when the trigger lever 7 is slightly pulled and turns off when the trigger lever 7 is fully released, and a variable switch that outputs a signal proportional to the trigger lever 7.

The second switch mechanism is a changeover portion for switching the rotation direction of the motor 4, and can employ a two-circuit two-contact toggle switch that is switched by swing of the swing arm 6b. The swing arm 6b has a neutral position shown in (A) of FIG. 5 that is not connected to any circuit. Here, the action portion 6c having a columnar shape and extending upward and downward is formed at the front end of the swing arm 6b, and the action portion 6c is located in a through hole of the forward/reverse changeover lever 8. With this configuration, when the forward/reverse changeover lever 8 is pressed in the direction of the arrow 9 as shown in FIG. 2, the state of (B) of FIG. 5 is formed, a part of the action portion 6c protruding downward is opposite to a concave portion 7b of the trigger lever 7, and thus an allowable state in which the trigger lever 7 can be pulled is formed. When the left end 8b of the forward/reverse changeover lever 8 is pressed in the direction opposite to the arrow 9 in FIG. 2, the state of (C) of FIG. 5 is formed, the part of the action portion 6c protruding downward is opposite to a concave portion 7c of the trigger lever 7, and thus the allowable state in which the trigger lever 7 can be pulled is formed. On the other hand, when the forward/reverse changeover lever 8 is set at the neutral position as shown in (A) of FIG. 5, the part of the action portion 6c protruding downward is opposite to a convex portion 7a of the trigger lever 7, and thus the convex portion 7a interferes with the action portion 6c so that the trigger lever 7 cannot be pulled mechanically. In other words, the action portion 6c and the convex portion 7a serve as a regulation mechanism that mechanically regulates operation of the forward/reverse changeover switch. In addition, at the position of (A) of FIG. 5, the second switch mechanism of the trigger switch 6 is also in a non-connection state, and there is no possibility of malfunction of the power tool 1 if the forward/reverse changeover lever 8 is located at this position.

Figure 6:
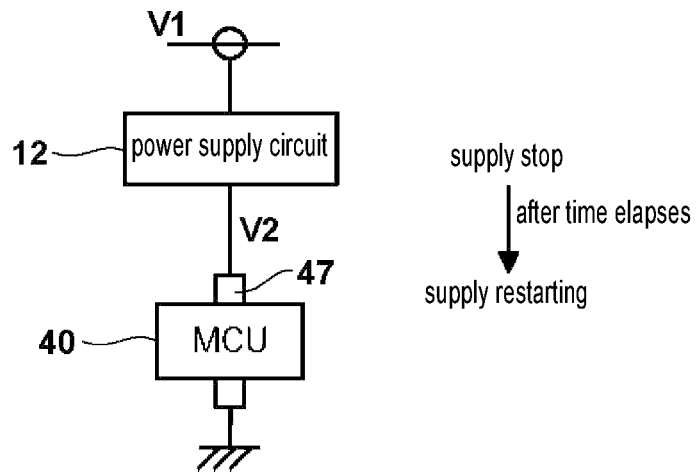
FIG. 6 is a circuit diagram for illustrating a resetting method of a microcontroller 40.

FIG. 6 is a diagram illustrating a general example of a resetting method of the microcontroller 40 (see FIG. 3). In the microcontroller 40, an operation voltage V2 of the microcontroller 40 is generated from a reference voltage V1 from the battery 50 via the power supply circuit 12 and supplied to a power supply input port 47 of the microcontroller 40. When power supply from the power supply circuit 12 is stopped by this circuit, the operation of the microcontroller 40 is stopped (shut down). Accordingly, if the operation of the power supply circuit 12 can be restarted without pulling the trigger lever 7 after the operation of the microcontroller 40 is stopped due to resetting, an automatic starting function of the microcontroller 40 after resetting can be realized. In the example, in order to automatically start the microcontroller 40 after resetting, instead of stopping the power supply circuit 12 and then performing the restarting operation, the microcontroller 40 is reset by the software. In addition, as an automatic starting function of the microcontroller 40 after software resetting, the self-holding signal is continuously output again in the on-duration time of an off-delay circuit 63, and thus the output of the power supply circuit 12 is maintained. A specific circuit for realizing this automatic starting function of the microcontroller 40 is described with reference to FIGS. 7 and 8.

Figure 7:
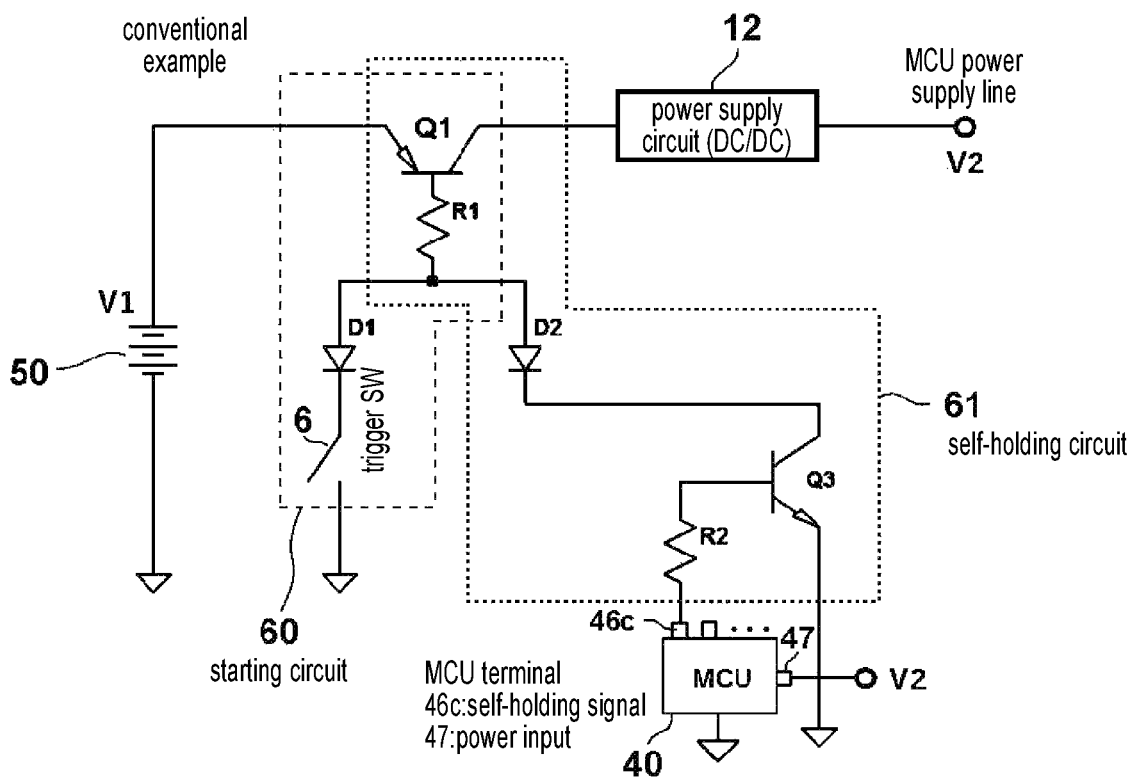
FIG. 7 is a diagram showing a conventional circuit for turning on or off power of the microcontroller 40.

FIG. 7 is a diagram showing a circuit for turning on or off the power supply of the microcontroller 40 according to the conventional example. As a basic configuration, a direct current voltage V2 of a low voltage (for example, 5 V or 3.3 V) is generated by the power supply circuit 12 from a voltage V1 (for example, 14.4 V or 18 V) of the battery 50. The microcontroller 40 operates using the voltage V2. The microcontroller 40 starts operating by the input of the voltage V2 to the power supply input port 47, and stops operating when the voltage V2 of the power supply input port 47 disappears. In a power supply path from the battery 50 to the power supply circuit 12, a semiconductor switching element (Q1) for conducting or cutting off the connection is arranged. For example, a PNP-type transistor Q1 can be used as the semiconductor switching element (Q1), and output of the first switch mechanism of the trigger switch 6 is input to the base of the semiconductor switching element (Q1) via a resistor R1.

When the user pulls the trigger lever 7 while the microcontroller 40 is stopped and the trigger switch 6 is turned on (conductive state) thereby, an emitter and a collector of the transistor Q1 are conducted, and the battery power V1 is supplied to the power supply circuit 12. The power supply circuit 12 includes a DC/DC converter, and the output voltage V2 (V2<V1) thereof is input to the power supply input port 47 of the microcontroller 40, and thus the microcontroller 40 is started. The microcontroller 40 outputs a self-holding signal via an A/D port 46c after starting and maintains the output in a high state. Because the self-holding signal from the A/D port 46c is input to the base of a transistor Q3 via a resistor R2, an emitter and a collector of the transistor Q3 are conducted, so that a base current of the transistor Q1 flows via the resistor R1; therefore, the ON state of the transistor Q1 is maintained even if the trigger switch 6 is turned off (non-conductive state). Here, as shown by the dotted line in FIG. 7, a starting circuit 60 includes the transistor Q1, the resistor R1, a diode D1, and the trigger switch 6. In addition, the self-holding circuit 61 of the power supply of the microcontroller 40 includes the transistors Q1 and Q3, the resistors R1 and R2, and a diode D2. Besides, the diodes D1 and D2 are arranged in these circuits to prevent a current flowing in the reverse direction.

When the trigger switch 6 is in the OFF state (non-conductive state), the microcontroller 40 turns off its own power supply by setting the output of the self-holding signal from the A/D port 46c to be low. Then, the transistor Q3 is turned off (the collector and the emitter are in the non-conductive state), and the transistor Q1 is also turned off accordingly, and thus the path from the battery 50 to the power supply circuit 12 is cut off. Thereby, power is not supplied to the microcontroller 40, and thus the microcontroller 40 is shut down. Besides, in order to restart the microcontroller 40 temporarily shut down, in the conventional circuit shown in FIG. 7, it is necessary that the user pulls the trigger lever 7 to turn on the trigger switch 6 again.

Figure 8:
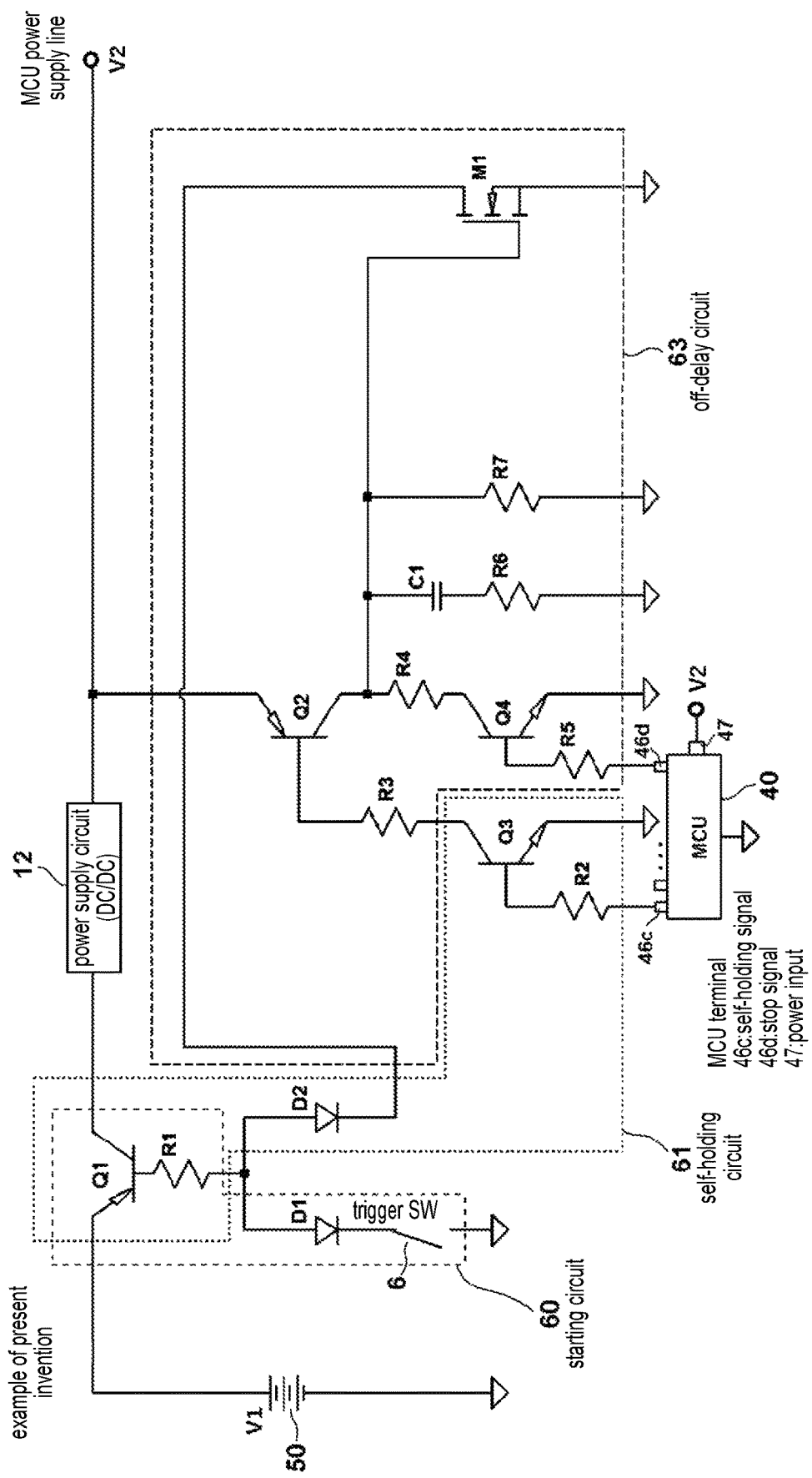
FIG. 8 is a circuit diagram according to the example for turning on or off power of the microcontroller 40.

FIG. 8 is a diagram showing a circuit for turning on or off the power supply of the microcontroller 40 in the example. The difference is that the off-delay circuit 63 shown by a dotted line is added between connection lines of a power supply self-holding circuit of the conventional circuit shown in FIG. 7. The same parts as those in FIG. 7 are denoted by the same reference signs. In order to restart the microcontroller 40 temporarily shut down, the transistor Q1 may be kept on even after the shutdown. The maintenance time (off-delay time) may be equal to or longer than the time until the microcontroller 40 is started after restarting and the output of the self-holding signal from the A/D port 46c is restarted. That is, the off-delay circuit keeps a signal equivalent to the self-holding signal that disappears during the shutdown for a short time, and a capacitor C1 serving as an electricity storage part is arranged in the circuit. The capacitor C1 has a function of storing electricity, and for example, an electrolytic capacitor can be used. By storing electric charges in the capacitor C1 in advance, even if the microcontroller 40 is temporarily turned off, the current of the resistor R1 is maintained not to be cut off by turning on the switching element M1 with the electric charges of the capacitor C1, and the connection state from the battery 50 to the power supply circuit 12 is maintained. The switching element M1 is, for example, a MOS-type field effect transistor (FET), and the high voltage side of the capacitor C1 is connected to the gate of the switching element M1. The low voltage side of the capacitor C1 is grounded via a resistor R6. The electric charges are automatically stored in the capacitor C1 when the microcontroller 40 is turned on; during the shutdown of the microcontroller 40 other than the time of resetting, the electric charges stored in the capacitor C1 is subjected to self-discharge within a relatively short time by an electricity discharge part including resistors R4 and R7 inserted in parallel with the capacitor C1.

The transistor Q2 is a switching element for taking the output of the power supply circuit 12 into the capacitor C1 according to a self-holding signal and keeping connection lines to the resistor R1, the diode D2 and the ground in the connection state. When the microcontroller 40 continues to output the self-holding signal after starting, the transistor Q3 is turned on (the collector and the emitter are in the conductive state), and the transistor Q2 is also turned on via the resistor R3 connected to the collector side of the transistor Q3. As a result, the output V2 of the power supply circuit 12 is connected to the capacitor C1 via the transistor Q2, and thus the electric charges are stored in the capacitor C1. Because the resistor R7 is arranged in parallel with the capacitor C1, the collector voltage of the transistor Q2 is input to the gate of the switching element M1, so that the switching element M1 keeps the ON state (the connection state between a drain and a source). When the switching element M1 is in the ON state, the diode D2 and the switching element M1 become a circuit equivalent to the diode D1 of the starting circuit and the trigger switch 6 in the ON state, and thus a state the same as the state in which the trigger lever 7 is pulled and the trigger switch 6 is turned on can be maintained, and the power supply circuit 12 can be automatically started.

A stop signal 46*d* is newly output from the microcontroller 40 to reliably perform the operation when the power is turned off by itself. Because the stop signal 46*d* is connected to the base of the transistor Q4 via a resistor R5, the transistor Q4 is turned on when the stop signal 46*d* becomes high. The resistor R4 is arranged between the collector side of the transistor Q4 and the collector side of the transistor Q2. By appropriately setting the value of the resistor R4 (for example, R4<<R7), when the transistor Q4 is turned on, the electric charges of the capacitor C1 can be consumed by the resistor R4, and the switching element M1 can be quickly turned off to stop the power supply to the microcontroller 40. On the other hand, when the firmware is updated, the stop signal 46*d* is kept low. Then, because the transistor Q4 is turned off, the electric charges of the capacitor C1 are not consumed by the resistor R4 and are mainly used to keep the switching element M1 on. With this configuration, it is possible to restart the microcontroller 40 during resetting. Next, a procedure for updating the firmware of the microcontroller using the circuit shown in FIG. 8 is described with reference to the flowcharts of FIGS. 9 and 10.

Figure 9:
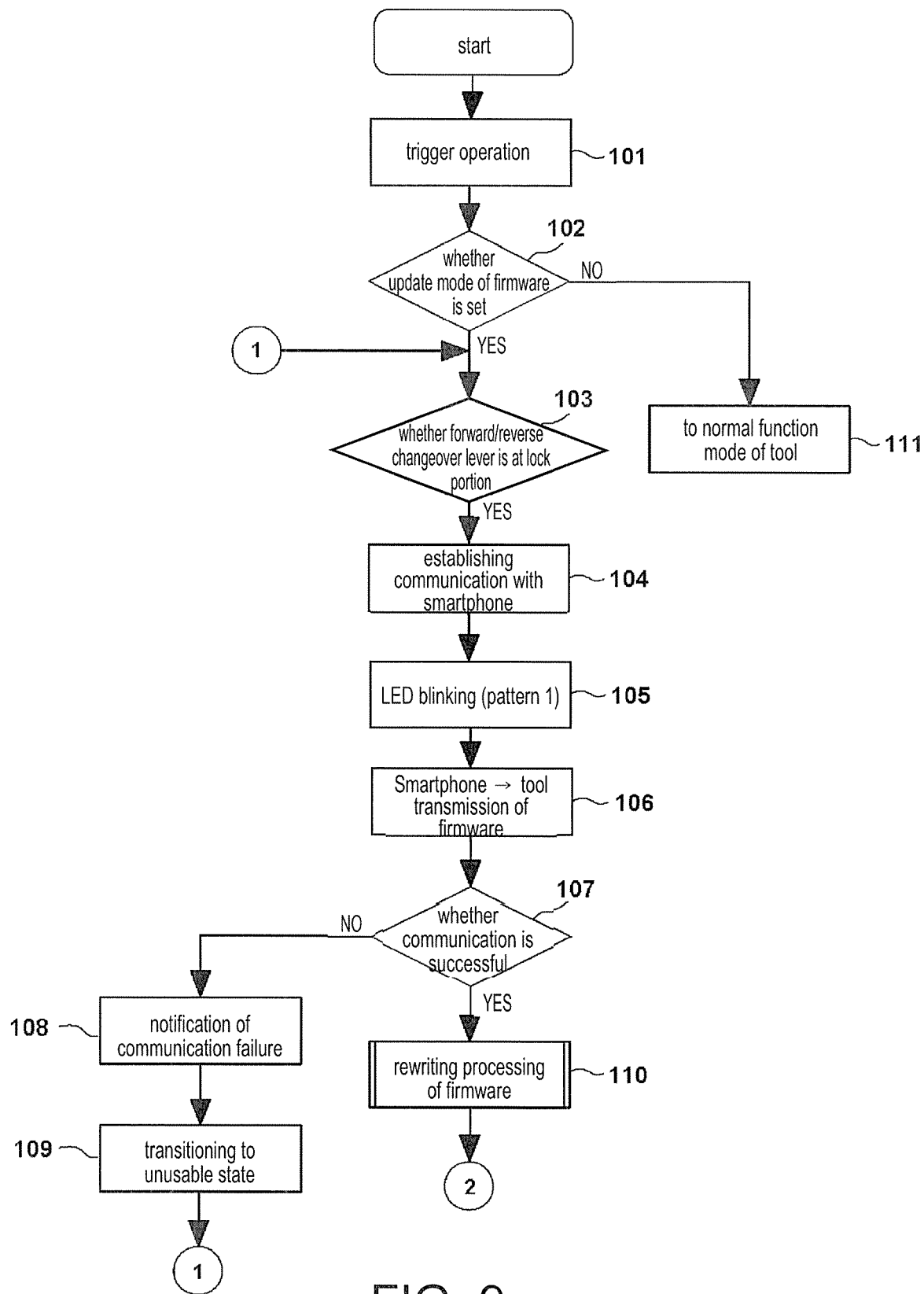
FIG. 9 is a flowchart showing a procedure for updating firmware of the microcontroller 40 (part 1).
Figure 10:
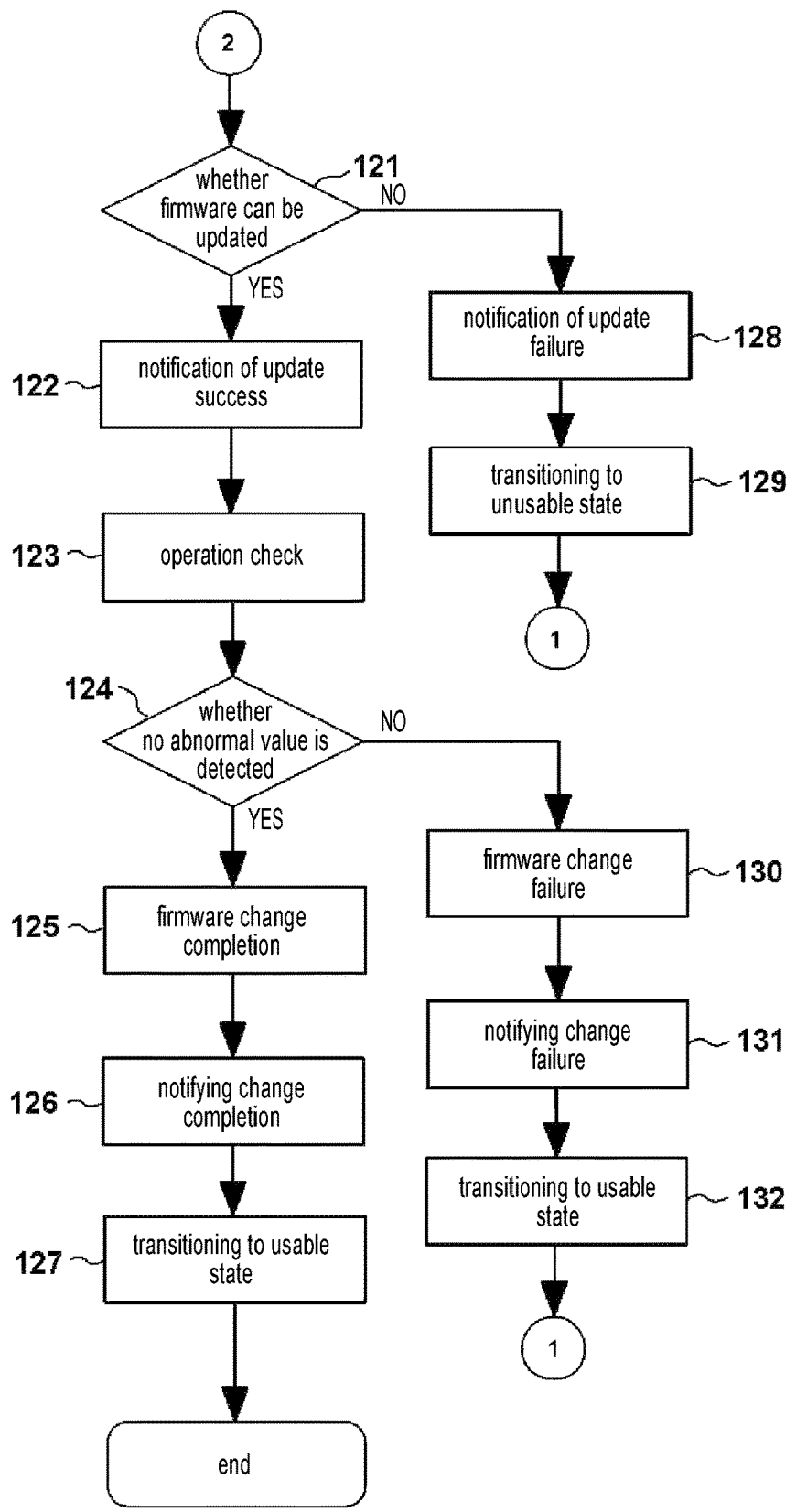
FIG. 10 is a continuation (part 2) of the flowchart in FIG. 9.

FIGS. 9 and 10 are flowcharts showing the procedure for updating the firmware of the microcontroller 40 (see FIG. 3). A series of procedures shown in FIGS. 9-10 can be executed by software using an update rewriting program (described later with reference to FIG. 11) stored in the ROM 43 of the microcontroller 40 in advance. In order to update the firmware of the microcontroller 40, a terminal device such as the smartphone 201 is prepared, the terminal device being capable of accessing the server 300 of a support company that provides update programs (set parameters or firmware) using a telephone communication network or some communication means as shown in FIG. 1. When the user who wants to update the power tool 1 has the smartphone 201, an application (not shown) provided by the support company may be installed on the smartphone 201. When the application of the smartphone 201 is started, an operation procedure is displayed on the screen 202, and thus necessary data is input to the smartphone 201 according to the operation procedure. The data input here is identification information of the power tool 1 in which the firmware is to be updated, for example, a model number and a serial number are input. Then, the input information is transmitted from the smartphone 201 to the server 300, and thus the server 300 confirms the presence or absence of the update firmware and the presence or absence of other support information. When there is update firmware, the update firmware is downloaded from the server 300 to the smartphone 201.

Next, the user starts the microcontroller 40 by operating the trigger lever 7 of the power tool 1, for example, by slightly pulling the trigger lever 7, according to the description displayed on the screen 202 of the smartphone 201 (step 101). In addition, by long-pressing a plurality of operation buttons, the microcontroller 40 is transitioned from an operation mode serving as a normal power tool to an "update mode" of the firmware. Next, the microcontroller 40 determines whether or not the update mode of the firmware has been set by the operation of step 101 (step 102). Here, when the plurality of operation buttons has not been long-pressed in step 101, the microcontroller 40 transitions to a normal function mode of the power tool 1 (step 111). In the normal function mode, the operation set by the forward/reverse changeover lever 8 is performed by pulling the trigger lever 7, but the operation is the same as that of the conventional power tool, and thus detailed description is omitted. When the firmware is in the update mode in step 102, the microcontroller 40 determines whether the forward/reverse changeover lever 8 is at a neutral position, that is, a lock position shown in (A) of FIG. 5 (step 103). When the forward/reverse changeover lever 8 is not at the lock position, the microcontroller 40 waits for the forward/reverse changeover lever 8 to reach the lock position. Besides, the microcontroller 40 may confirm the setting position of the forward/reverse changeover lever 8 and also check whether the remaining amount of the battery 50 is sufficient or whether there is any other reason to hinder communication or firmware update work. When the forward/reverse changeover lever 8 is set at the lock position, a wireless communication path with the smartphone 201 is established (step 104). The connection method of this communication may be in accordance with a connection method using the Bluetooth (registered trademark) widely used in the smartphone 201. Here, the wireless communication path is not limited to the use of Bluetooth (registered trademark), but it is important that the wireless communication path is not one-way communication but two-way communication.

When the wireless communication path is established in step 104, the LED lamp blinks in a specific state (pattern 1) (step 105). This blinking pattern is preferably displayed so as not to appear during normal operation of the power tool 1. For example, the two LEDs on both sides of the mode display lamp 28 consisting of four LEDs shown in FIG. 1 may be made to blink slowly. Next, the update firmware to the power tool 1 is transmitted from the smartphone 201 (step 106). Next, the microcontroller 40 determines whether the communication is successful, and when the communication is successful and all the update firmware is received, the received firmware is stored in the ROM 43 (see FIG. 3) inside the microcontroller 40. Determination is made on whether or not the communication is successful in step 107, and when the communication fails, the fact that the communication has failed is notified (step 108), and the power tool 1 is transitioned to an unusable state and the process returns to step 103 (step 109).

When the communication is successful in step 107, rewriting processing of the programs is performed next (step 110). Details of the rewriting processing are described later with reference to FIGS. 11-13. Update processing of the firmware includes resetting of the microcontroller 40 (the procedure is described later). When the resetting of the microcontroller 40 is completed, the microcontroller 40 after restarting determines whether a flag indicating the update condition of the firmware (a rewriting completion flag described later with reference to FIG. 13) is TRUE, and thereby determines whether or not the firmware can be updated (step 121); when the update is successfully performed, the microcontroller 40 notifies the success of the update (step 122), and checks the operation (step 123). The operation check after updating the firmware can perform an operation check automatically or manually. Various methods for determining whether or not the update is successful are considered; for example, a current value flowing through the motor in a predetermined operating state is measured, and determination can be made according to whether or not an abnormal value such as an excessively large current value, an unstable current value, or an excessively small current value is generated. In addition, determination can also be made by detecting an abnormality in the rotation number of the motor. For example, if an overshoot is large or a hatching is generated when the motor is controlled to rotate at a set rotation number, the program may not be updated normally. In addition, when the motor rotation number does not reach the set rotation number or when the motor rotates irregularly, the program may not be updated normally.

When determination in step 121 is determined that an abnormal program has been written into the ROM 43 (see FIG. 3), an update failure is notified and the power tool 1 is disabled (steps 128 and 129). With this configuration, it is possible to prevent interference due to the runaway of the power tool 1 and completely eliminate the risk of harm to the user. In addition, if the operation check is automatically performed, the user does not need to confirm the operation, and thus the time required for firmware update can be reduced. After step 129, the process returns to step 103 to retry the reception of the firmware.

When the firmware update succeeds and the operation check of the firmware is performed in step 123, the microcontroller 40 determines whether or not an abnormal value has been detected (step 124). Here, in a normal case where no abnormal value has been detected, determination is made that change processing of the firmware has been completed (step 125), and the mode display lamp 28 is turned on in the form of pattern 2 different from pattern 1. For example, by turning on the two LEDs on both sides of the mode display lamp 28, the user is notified of the change completion of the firmware (step 126). Thereafter, the microcontroller 40 transitions the power tool 1 to the usable state (step 127) and ends the update processing of the firmware.

When determination is made that an abnormal value has been detected in the operation check of the firmware in step 124, it is determined that the firmware update fails (step 130), and the mode display lamp 28 is turned on in the form of pattern 3. For example, the user is notified that the firmware change has failed by quickly blinking the two LEDs on both sides of the mode display lamp 28 at an interval sufficiently shorter than pattern 1 (step 131). At this time, because it is necessary to update the firmware again or return the firmware to the state before update, the microcontroller 40 transitions the power tool 1 to the unusable state (step 132). In the case of the unusable state, the microcontroller 40 does not (cannot) perform control for motor rotation even if the forward/reverse changeover lever 8 is set to forward rotation or reverse rotation and the trigger lever 7 is pulled. After step 129, the process returns to step 103 to retry the reception of the firmware.

Next, the procedure of rewriting of a flash memory used for the ROM 43 is described with reference to FIGS. 11 and 12. In (A) of FIG. 11, the region surrounded by a square indicates a memory space of the ROM 43, and a tool function program 151 for making the power tool 1 function is stored in a large part of the memory space, and a rewriting program 152 serving as a program for rewriting the tool function program 151 into a new program is stored in another region. In the memory space, the region in which neither the tool function program 151 nor the rewriting program 152 is stored is a free region 153.

Figure 11:
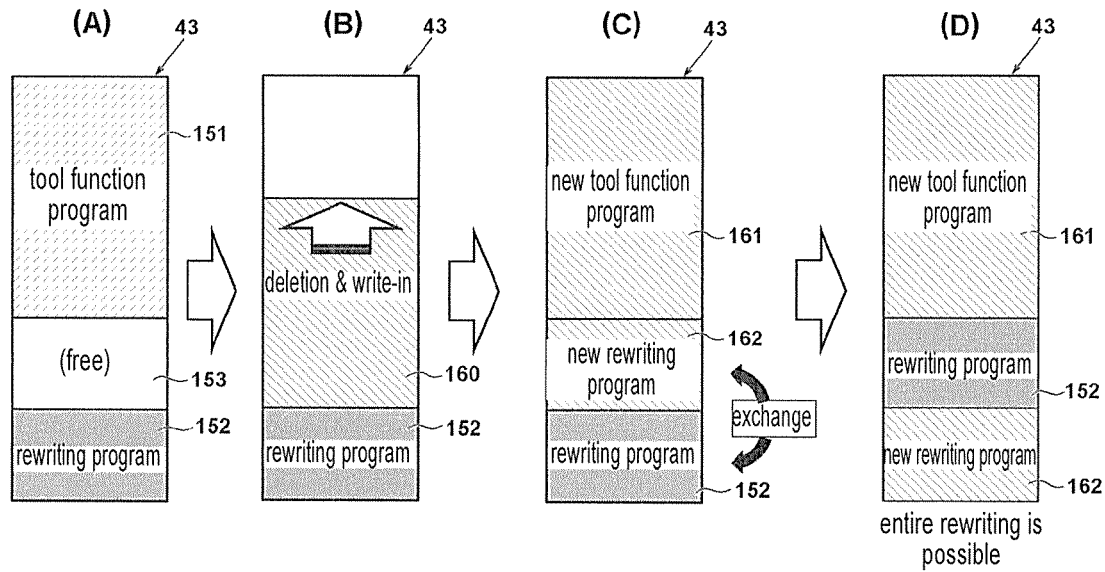
FIG. 11 is a diagram for illustrating a procedure for updating the firmware of the microcontroller 40 to a ROM 43.

When the tool function program 151 is replaced with a new version, as shown in (B) of FIG. 11, an update firmware 160 received from the smartphone 201 using the communication function is written so as to overwrite on the free region 153 and the storage region of the tool function program 151. The update firmware 160 is the collection of a tool function program 161 being version upgraded and a new rewriting program 162. In (B) of FIG. 11, the update firmware 160 is written from the rear side near the rewriting program 152 toward the front side of the memory space. In addition, because the ROM 43 uses a flash memory, deletion operation for setting all cells in a predetermined block to "1" is performed and then new data is written in during the overwriting. In this manner, when the entire update firmware 160 is written in, as shown in (C) of FIG. 11, the updated new tool function program 161 is stored in the first half part, and the rewriting program 162 is stored thereafter.

Next, as shown in (D) of FIG. 11, the rewriting program 152 exchanges the positions of the new rewriting program 162 and the rewriting program 152 before update. According to this procedure, in the storage region of the ROM 43, the new tool function program 161 is located from the front, and the new rewriting program 162 is located from the rear. Besides, in (D) of FIG. 11, the old rewriting program 152 may delete a region corresponding to 152 without exchanging.

Figure 12:
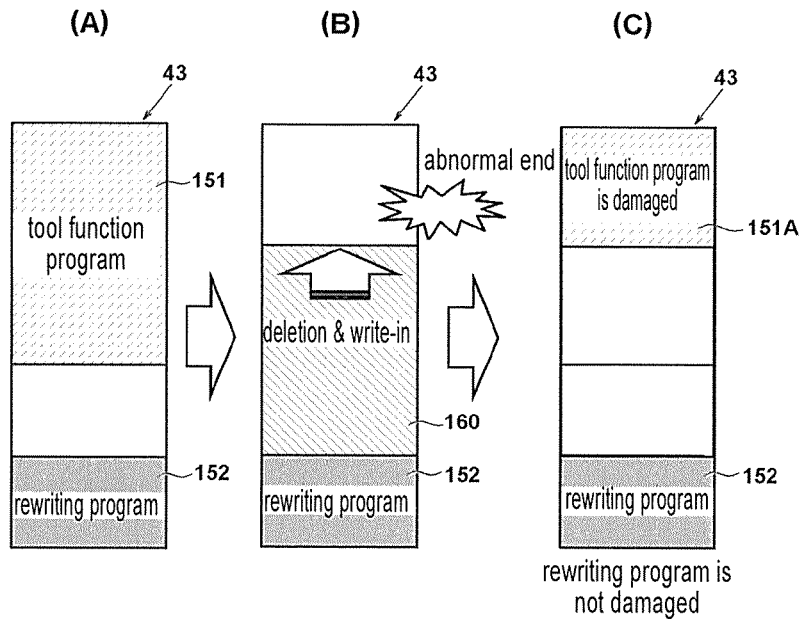
FIG. 12 is a diagram for illustrating processing when the firmware update shown in FIG. 11 has failed.

FIG. 12 is a diagram for illustrating a processing method when the firmware update shown in FIG. 11 has failed. The procedure of (A) and (B) of FIG. 12 is the same as the procedure of FIG. 11, but some abnormality is generated during deletion or writing work of the update firmware 160 in (B) of FIG. 12, and the writing work is interrupted. In this case, the microcontroller 40 performs processing using a flag when an abnormality is generated in the update work of the firmware. The flag indicating an abnormality may include a flag indicating that the update firmware 160 cannot be completely received due to a communication abnormality with the smartphone 201, a flag indicating that the writing processing to the ROM 43 cannot be made, and the like.

In the state of (B) of FIG. 12, because a part of the original tool function program 151 is also overwritten and damaged, only a part 151A of the normal tool function program 151 remains as shown in (C) of FIG. 12, therefore, the tool function program 151 cannot be used directly. Thus, the microcontroller 40 is restarted using an error processing routine included in the rewriting program 152, and thereafter retries error recovery processing, that is, the rewriting shown in FIG. 11. In this manner, in the example, the rewriting program 152 has a structure that is not damaged even when the firmware 160 ends abnormally during the update work. Particularly, if the communication control program with the smartphone 201 is included in the rewriting program 152, the error processing or the retry work can be performed using the rewriting program 152 until the tool function program 151 is normally updated and the new tool function program 161 is stored.

In the example shown in FIGS. 11 and 12, the storage region of the ROM 43 is limited, and the free region 153 sufficient to temporarily store the entire firmware to be updated is not secured. However, a backup memory region which is sufficiently large may be arranged as the free region 153 on the same memory or on another memory, the update firmware 160 may be temporarily stored in the backup memory region, and the storage positions of the tool function program 151 and the new tool function program 161 may be rearranged in the memory after the storage. Accordingly, even when the reception of the tool function program 161 is not completed due to a communication failure, the original tool function program 151 is not damaged.

Next, the operation procedure of the rewriting program 152 is described with reference to the flowchart of FIG. 13. There are two cases, one in which the rewriting program 152 is first executed when the power tool 1 is started (step 171 and step 181), and the other one in which the rewriting program 152 performs specific operations and transitions to the update mode of the firmware during execution of the tool function program 151 (a flow from step 181 to steps 182, 176-179). When the power tool 1 is started, the rewriting program 152 is executed, and it is confirmed by a "rewriting completion flag" whether the writing has ended normally last time (step 171). Because the "rewriting completion flag" of the power tool 1 is "1 (TRUE)" during shipment from the factory, the operation of the rewriting program 152 normally ends only with the confirmation processing in step 171 and the execution of the tool function program 151 in step 181 is started. In the tool function program 151, the main processing of the tool function operation is performed (step 181); at this time, determination is made on whether or not there is an operation for transitioning to the update mode of the firmware (the rewriting mode of the programs) as shown in step 102 of FIG. 9 (step 182). When not in the update mode of the firmware, transition to the function operation serving as the power tool 1 is made (step 183), and a main processing loop 184 thereof is executed. As shown in FIG. 12, the tool function program 151 is a program part that may be damaged due to an abnormal end during rewriting of the example.

In step 182, in the case of the rewriting mode of the firmware, the reception of the update program data is waited (step 176), and the update program is received (the update firmware 160). When all the update program data has been received (step 177), the rewriting completion flag is set to "0 (FALSE)" (step 179), and the process proceeds to step 174. When all the update programs cannot be received within a predetermined time in step 177, the process transitions to step 181 as a timeout error (step 178). When the rewriting completion flag is already "0 (FALSE)" in step 171, for example, when an abnormality end in the processing before resetting, the reception of the update program data is waited (step 172) and the process proceeds to step 174 if all the update program (the update firmware 160) has been received (step 173). In step 174, the rewritten proceeding of the firmware (the new tool function program 161 and the new rewriting program 162) from (B) of FIG. 11 to (C) and (D) of FIG. 11 is performed, the rewriting completion flag is set to "1 (TRUE)" when the writing is normally completed, and the process returns to a jump source. If the rewriting has not been normally completed in step 175, a rewriting error is generated and an update failure is notified (step 180). The firmware can be updated according to the procedure in abnormality.

Figure 13:
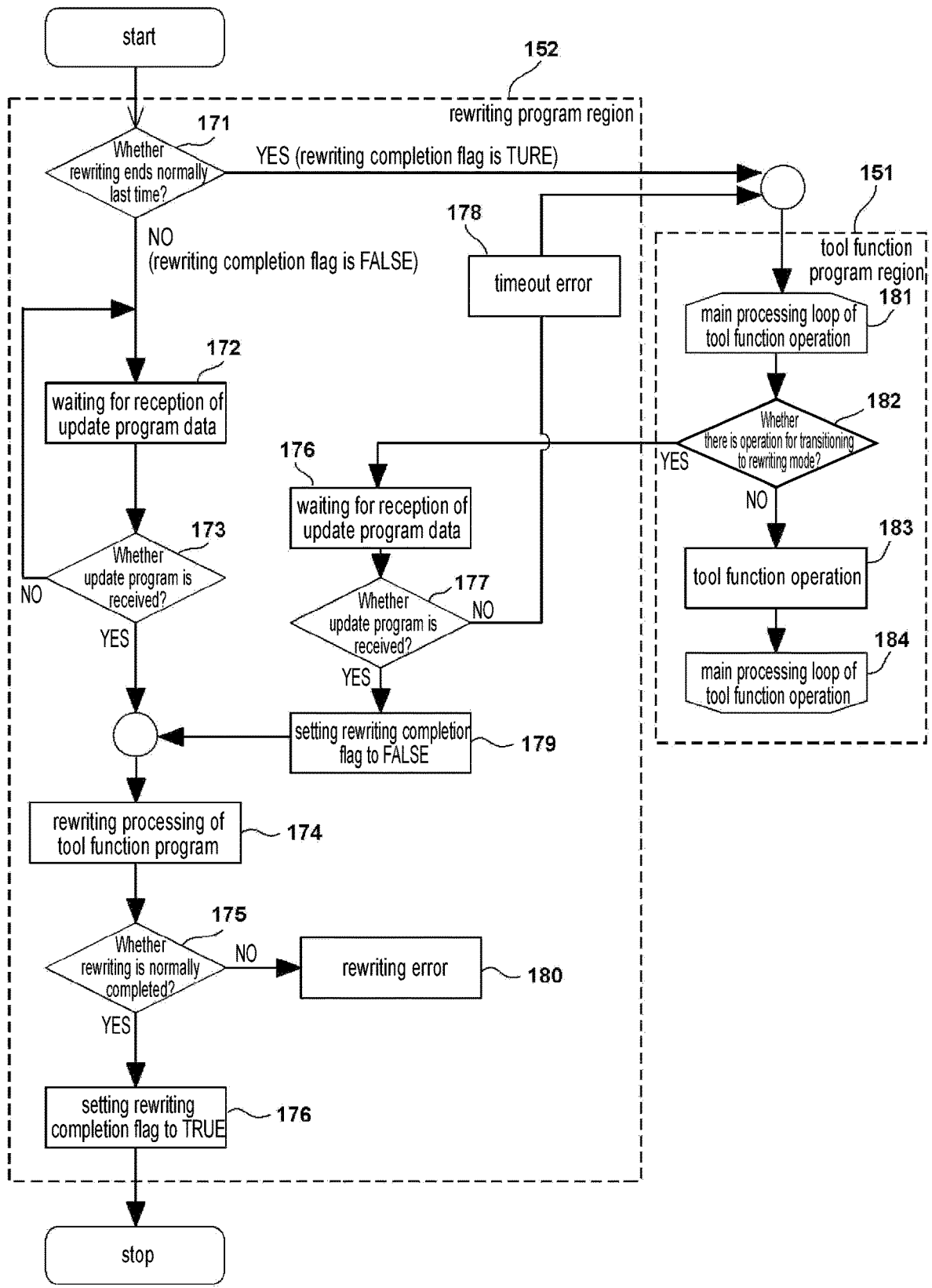
FIG. 13 is a flowchart illustrating a procedure for updating the firmware by a rewriting program 152 in FIG. 11.
Figure 14:
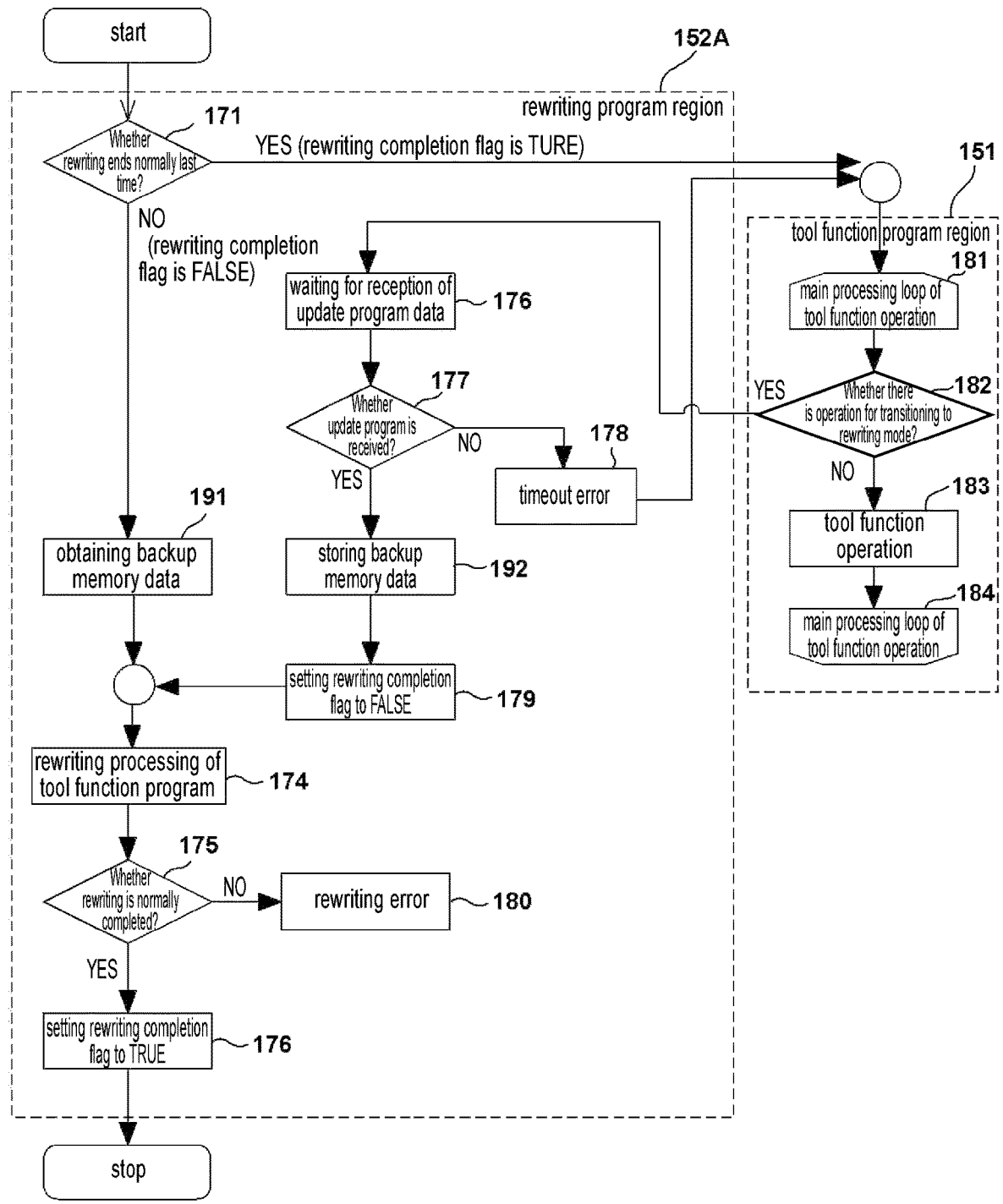
FIG. 14 is a flowchart showing another procedure for updating the firmware by a rewriting program 152 in FIG. 11.

FIG. 14 is a flowchart showing a variant of the procedure shown in the flowchart of FIG. 13. Here, a procedure for using a backup memory to perform rewriting work of the flash memory shown in FIG. 11 is shown, and the same steps as those in FIG. 13 are denoted by the same step numbers. Here, when the rewriting completion flag is "0 (FALSE)" in step 171, it indicates that data sent from the smartphone 201 has already been stored in the backup memory, and thus the microcontroller 40 obtains the data from the backup memory (step 191), and performs the writing processing of the tool function program (step 174). On the other hand, when transitioning to step 182 and transitioning to the rewriting mode, the reception of the update program is waited (step 176), and the data is sequentially stored in the backup memory when the update program is received (steps 177 and 192). When all of the received data is completely stored in the backup memory, the rewriting completion flag is set to "0 (FALSE)" (step 179), and the process proceeds to step 174. The processing after step 174 or the operation procedure on the tool function program 151 side is the same as that in FIG. 13. In this manner, even in the processing using the backup memory or the backup storage region, the update operation as shown in FIGS. 11 and 12 can be performed. Moreover, even in the case of an abnormal end during the update work, the rewriting program is not damaged. In addition, if a program for executing the communication function is also included in the rewriting program 152, the communication function has no risk of damage even if an abnormality is generated during the update work.

Figure 15:
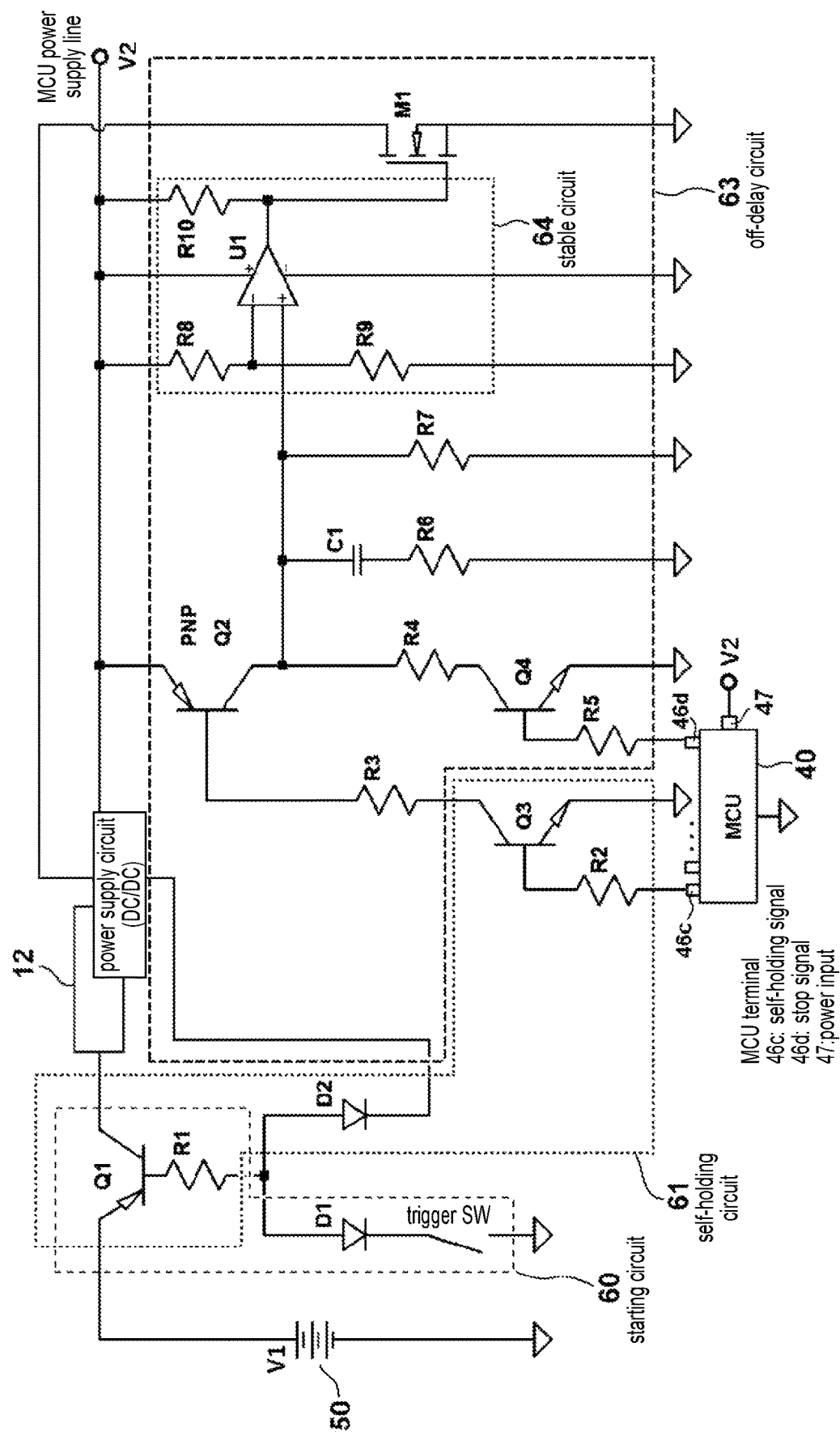
FIG. 15 is a variant of the circuit shown in FIG. 8 for turning on or off power of the microcontroller 40.

The examples of the present invention have been described above, but the above configuration can be variously modified. For example, the power supply circuit for the microcontroller 40 shown in FIG. 8 may further use a comparator U1 in the off-delay circuit, and thereby digitally control the switching element M1 without directly controlling the switching element M1 by the voltage of the capacitor C1. FIG. 15 is a circuit showing this variant, and a stable circuit 64 surrounded by a dotted line is added as compared with FIG. 8. In the circuit of FIG. 8, the electric charges of the capacitor C1 are directly input to the gate of the switching element M1, but in this case, a voltage less than the saturation region of FET is applied, resulting in loss or the possibility of failure. Thus, the voltage between the power supply line V2 and the ground is divided by two resistors R8 and R9 to create a reference voltage, and a gate signal of the switching element M1 is set high when the voltage of the capacitor C1 is higher than the reference voltage, and the gate signal is set low when the voltage of the capacitor C1 is lower than the reference voltage. In other words, when the voltage of the capacitor C1 is put into the comparator and the voltage is higher than a certain level, a clear high signal of 5 V or more can be output to the gate of the switching element M1. In addition, when the voltage of the capacitor C1 is less than a certain value, the gate signal of the switching element M1 can be kept low, and thus the operation of the switching element M1 can be stabilized, and the operation continuation of the power supply circuit 12 during resetting can be reliably ensured.

Figure 16:
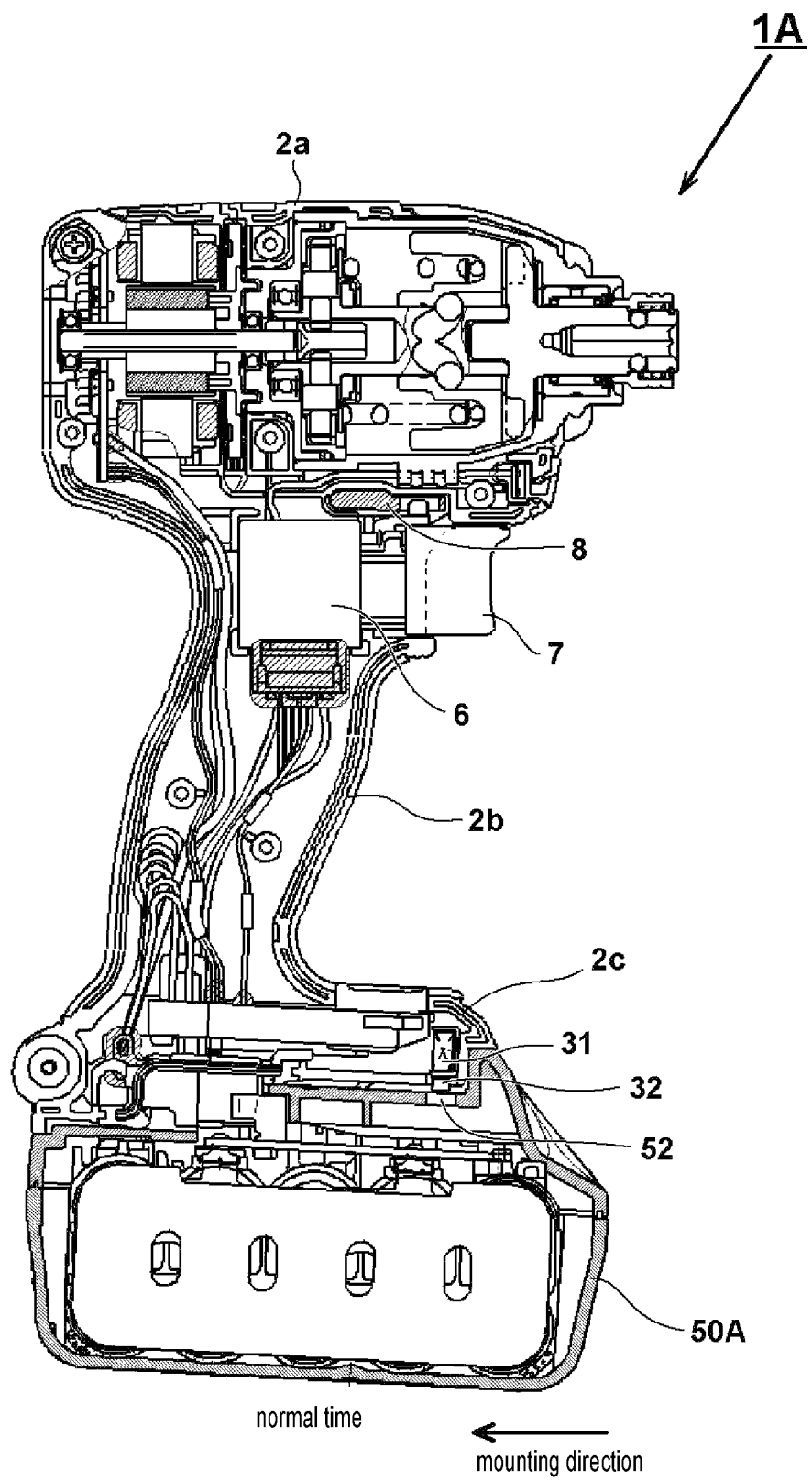
FIG. 16 is a longitudinal cross-sectional view of a power tool 1A according to a variant of the example of the present invention, showing a mechanism for preventing removal of a battery 50A.
Figure 17:
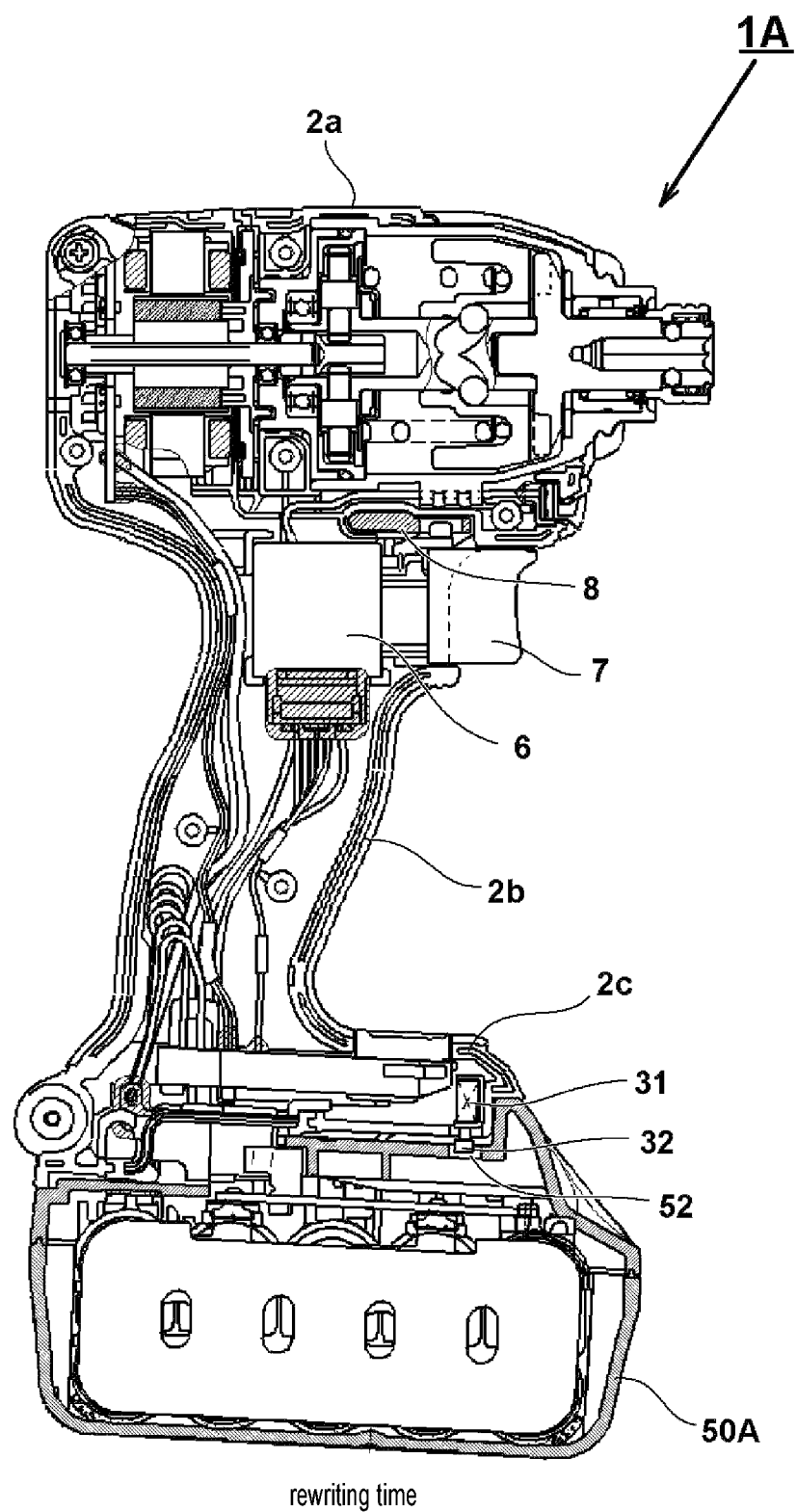
FIG. 17 is a diagram showing a state in which the mechanism for preventing removal of the battery 50A operates in the power tool 1A of FIG. 16

When the firmware update of the power tool is performed by wireless communication, different from the case of rewriting a part of the memory, there may not be recovery possibility when the processing is interrupted due to voltage reduction in the battery, removal of the battery in the middle, and the like. Thus, the present invention provides a method for software coping with an abnormal end during firmware update as described above. However, the greatest risk in the firmware update of the power tool 1 is to remove the battery 50 during rewriting of the firmware. Thus, in the above example, notification is performed by blinking LEDs or the like during the rewriting work of the firmware as a notification approach. As another method, during the rewriting work of the firmware, the motor may be rotated at an extremely low speed as a notification approach but not as a function of the power tool. Furthermore, a configuration may be employed in which detection is made that a battery is about to be removed by a user and a warning sound is output. For example, a sensor 14 for acceleration or the like (see FIG. 3) may be mounted on the power tool to detect that the power tool is lifted up or the posture of the power tool is changed during rewriting and issue a warning sound such as a beep sound or the like at this time. In addition, a half-insertion state of the battery may be detected, and a warning sound may be issued immediately when the battery is released from a fully-inserted state and comes into the half-insertion state. Furthermore, a lock part may be arranged so that the battery is not removed due to a mechanical configuration during the rewriting of the firmware. FIGS. 16 and 17 show this mechanical lock part.

FIG. 16 is a diagram showing a mechanism for preventing removal of the battery 50, and is a longitudinal cross-sectional view of the power tool 1. A battery 50A is mounted on the lower side of the battery mounting portion 2c of the housing 2. The mounting direction of the battery 50A is directed from the front to the rear, and during the removal, the battery 50A is moved in a direction opposite to the mounting direction while the latch button 51 is pressed (see FIG. 1). A solenoid 31 that can prevent this moving direction is newly arranged. The solenoid 31 applies the principle of an electromagnet to operate an actuator 32 configured by movable magnetic poles, and is disposed so that the actuator 32 is oriented in a direction orthogonal to the mounting direction. In a condition where power is not supplied to the actuator 32 due to a biasing force from a spring, the actuator 32 does not protrude as shown in FIG. 16, and when power is supplied to the actuator 32, the actuator 32 overcomes the biasing force from the spring and protrudes outside according to the principle of the electromagnet. The protruding actuator 32 is located inside a lock hole 52 arranged on the upper surface of the housing of the battery 50A. FIG. 17 shows the state in which the actuator 32 protrudes. A timing at which the actuator 32 protrudes in this manner is locked in step 103 of FIG. 9 and released from the locked state in step 126 of FIG. 10. The operation of the actuator 32 can be controlled by the microcontroller 40, and the control program may be included in the rewriting program 152. As described above, with the configuration in which the battery 50A cannot be removed when the firmware is rewritten, there is no risk of interruption of the power supply, and thus the risk of update failure of the firmware can be greatly suppressed.

The present invention has been described based on the examples, but the present invention is not limited to the above examples, and various modifications can be made without departing from the gist of the present invention. For example, the work device is not limited to the power tool such as an impact driver as in the above examples, and the present invention can be applied to any work device, such as an electric brush cutter or vacuum cleaner, a fan, a light, which has a motor and a microcontroller that controls the motor and has a communication part.

What is claimed is:

1. A work device, comprising:
    a microcontroller used for executing a program,
    a power supply circuit that generates a voltage supplied to the microcontroller,
    a changeover switch for supplying the electric power to the microcontroller,
    power supply from the power supply circuit to the microcontroller being started by an operation of the changeover switch,
    a self-holding circuit that continues to maintain power supply from the power supply circuit by output from the microcontroller even after the operation of the changeover switch is returned, and the microcontroller stops output to the self-holding circuit to thereby stop the power supply from the power supply circuit to the microcontroller, and
    an off-delay circuit for temporarily continuing the power supply to the microcontroller even after the power supply to the microcontroller is cut off.

2. The work device according to claim 1, comprising: a communication apparatus capable of wirelessly performing two-way communication between an external device and the microcontroller, and a memory apparatus being rewritable that causes the work device to perform a predetermined operation and stores the program;
    wherein the microcontroller reflects an update program obtained from outside via the communication apparatus in the memory apparatus.

3. The work device according to claim 2, comprising: a regulation mechanism that mechanically regulates the operation of the changeover switch,
    wherein writing of the update program to the memory apparatus is allowed only when the operation of the changeover switch is regulated by the regulation mechanism.

4. The work device according to claim 3, wherein the regulation mechanism has a changeover portion for switching a rotation direction of a motor, and
    the changeover portion has, in addition to a lock position where an operation of the changeover switch is prevented, at least one rotation position where the operation is allowed.

5. The work device according to claim 4, wherein the work device transmits a rotation force of the motor to a front end tool via a power transmission mechanism,
    the changeover switch is a trigger switch arranged in a housing, and
    the changeover portion is a forward/reverse changeover switch for switching a rotation direction of the motor.

6. The work device according to claim 2, wherein the memory apparatus further has a second storage region different from a storage region in which the program is stored, and the update program received from the outside is stored in the second storage region.

7. The work device according to claim 1, wherein the off-delay circuit is connected to the self-holding circuit and comprises an electricity storage part.

8. The work device according to claim 7, wherein the off-delay circuit has a comparator for stabilizing output from the electricity storage part.

9. The work device according to claim 7, wherein an electricity discharge part is arranged in the off-delay circuit, electric power of the electricity storage part disappears when power supply of the microcontroller is cut off and a fixed time has elapsed, and the electricity storage part stores electricity every time the microcontroller is started.

10. A work device, comprising:
    a control apparatus that controls an operation of a device,
    a microcontroller arranged in the control apparatus and used for executing a program,
    a motor that operates the device, a batterythat supplies electric power to the microcontroller and the motor,
    a power supply circuit that generates a constant low voltage supplied to the control apparatus from the electric power of the battery, and
    a changeover switch for supplying the electric power from the battery to the control apparatus,
    power supply from the power supply circuit to the control apparatus being started by an operation of the changeover switch;
    wherein further comprising:
    a communication apparatus capable of wirelessly performing two-way communication between an external device and the microcontroller,
    a memory apparatus being rewritable that causes the work device to perform a predetermined operation and stores the program, and
    a regulation mechanism that mechanically regulates the operation of the changeover switch;
    wherein the microcontroller reflects an update program obtained from outside via the communication apparatus in the memory apparatus; and
    writing of the update program to the memory apparatus is allowed only when the operation of the changeover switch is regulated by the regulation mechanism.

11. The work device according to claim 10, comprising:
a motor that operates the device,
 wherein the regulation mechanism has a changeover portion for switching a rotation direction of the motor, and
 the changeover portion has, in addition to a lock position where an operation of the changeover switch is prevented, at least one rotation position where the operation is allowed.

12. The work device according to claim 11, wherein the work device transmits a rotation force of the motor to a front end tool via a power transmission mechanism,
 the changeover switch is a trigger switch arranged in a housing, and
 the changeover portion is a forward/reverse changeover switch for switching a rotation direction of the motor.

13. The work device according to claim 10, wherein the memory apparatus further has a second storage region different from a storage region in which the program is stored, and the update program received from the outside is stored in the second storage region.

14. A work device, comprising:
a microcontroller used for executing a program,
a power supply circuit that generates a voltage supplied to the microcontroller, and
a changeover switch for supplying the electric power to the microcontroller,
a communication apparatus capable of performing communication between an external device and the microcontroller,
a memory apparatus being rewritable that stores the program, and
a regulation mechanism that mechanically regulates the operation of the changeover switch;
wherein the microcontroller is configured to reflect an update program obtained from outside via the communication apparatus in the memory apparatus; and
writing of the update program to the memory apparatus is allowed only when the operation of the changeover switch is regulated by the regulation mechanism.

\* \* \* \* \*